(12) United States Patent
Nakajima et al.

(10) Patent No.: US 8,654,455 B2
(45) Date of Patent: Feb. 18, 2014

(54) LIGHT QUANTITY ADJUSTMENT APPARATUS, LENS UNIT AND OPTICAL APPARATUS PROVIDED WITH THE SAME

(75) Inventors: Katsura Nakajima, Yamanashi-ken (JP); Hiroaki Naganuma, Yamanashi-ken (JP)

(73) Assignee: Nisca Corporation, Minamikoma-gun, Yamanashi-ken (JP)

( * ) Notice: Subject to any disclaimer, the term of this patent is extended or adjusted under 35 U.S.C. 154(b) by 59 days.

(21) Appl. No.: 13/466,587

(22) Filed: May 8, 2012

(65) Prior Publication Data
US 2012/0287516 A1    Nov. 15, 2012

(30) Foreign Application Priority Data

May 10, 2011  (JP) .................................. 2011-104964
Jul. 13, 2011  (JP) .................................. 2011-154631

(51) Int. Cl.
*G02B 9/08*  (2006.01)
*G02B 26/02*  (2006.01)

(52) U.S. Cl.
USPC ........................... 359/738; 359/230; 359/739

(58) Field of Classification Search
USPC .................................. 359/230, 234, 738–740
See application file for complete search history.

(56) References Cited

U.S. PATENT DOCUMENTS

2010/0014172 A1*  1/2010  Koyama et al. ............... 359/739

FOREIGN PATENT DOCUMENTS

| JP | 2006-322979 | 11/2006 |
| JP | 2009-020438 | 1/2009 |

* cited by examiner

*Primary Examiner* — William Choi
(74) *Attorney, Agent, or Firm* — Manabu Kanesaka

(57) ABSTRACT

A plurality of blade members is overlapped and disposed in the shape of scales in a ring-shaped board having an optical-axis aperture at the center, and is held from above by a driving ring so that each blade member performs open/close motion. At this point, an elastic member is disposed between the blade members and the board to press each blade member against the driving ring side, or an elastic member is disposed between the blade members and the driving ring to press the blade members against the board side, and in this state, the blade members are opened and closed.

21 Claims, 27 Drawing Sheets

CROSS-SECTIONAL VIEW OF LINE a-a

CROSS-SECTIONAL VIEW OF LINE b-b

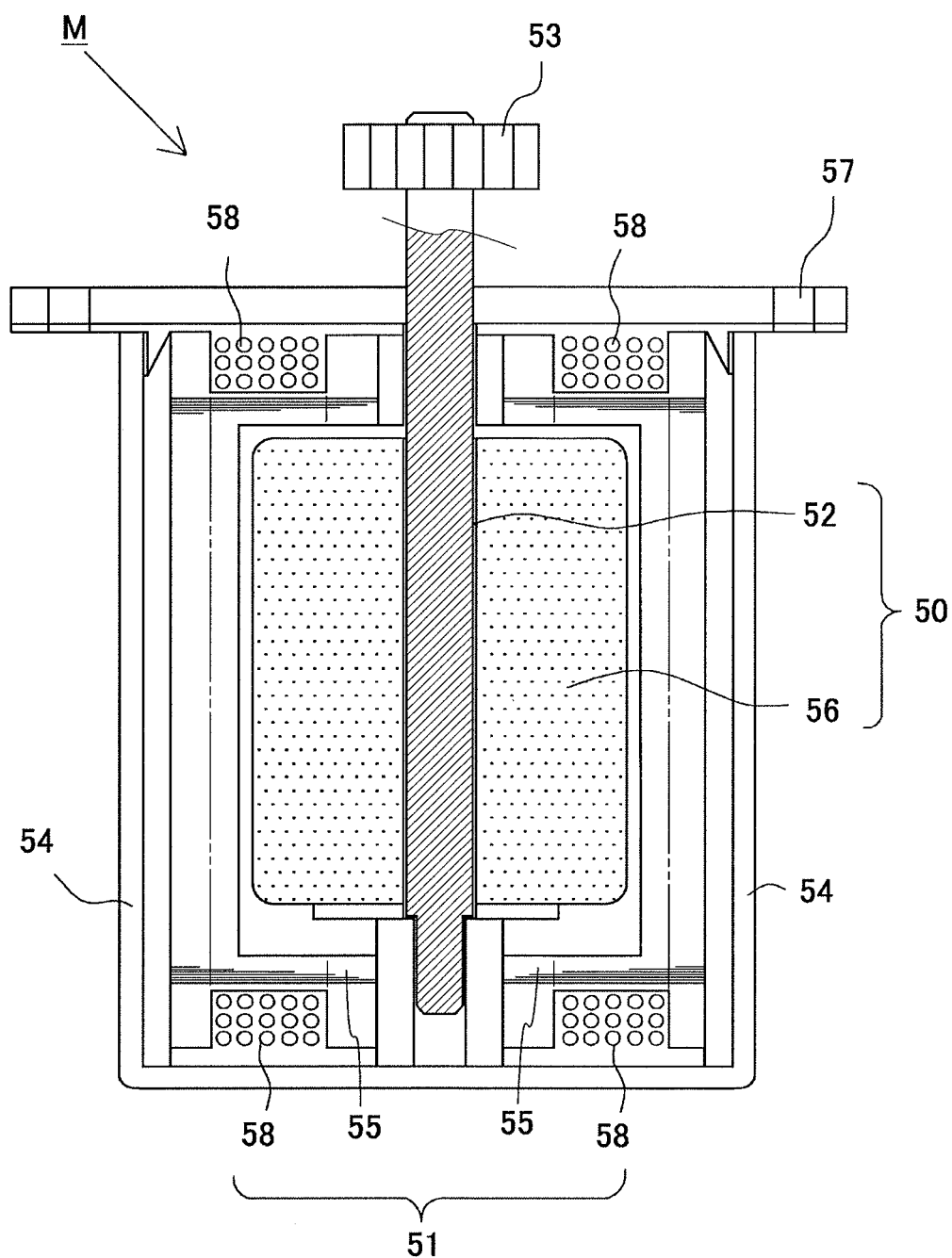

ENLARGED CROSS-SECTIONAL VIEW OF LINE a-a

PRIOR ART

PRIOR ART

LIGHT QUANTITY ADJUSTMENT APPARATUS, LENS UNIT AND OPTICAL APPARATUS PROVIDED WITH THE SAME

TECHNICAL FIELD

The present invention relates to a light quantity adjustment apparatus that is incorporated into an image pickup apparatus such as a video camera and still camera or a projection apparatus such as a projector and that adjusts a quantity of light such as a shooting light quantity and projection light quantity.

BACKGROUND ART

Generally, this type of light quantity adjustment apparatus is known as an apparatus in which a board having an optical-axis aperture is disposed in a shooting light path (or projection light path), a plurality of light quantity adjustment blades is disposed in the board to be openable and closable so as to make the optical-axis aperture a large diameter or a small diameter, and a quantity of light is thereby adjusted.

For example, Japanese Patent Application Publication No. 2009-020438 (Patent Document 1) discloses an iris diaphragm apparatus in which a plurality of blades is disposed around an optical-axis aperture formed in a board, and opens and closes the light path diameter from a small diameter to a large diameter in similar shapes. It is known that such a diaphragm apparatus has the feature of adjusting a quantity of light in multi-stage with diameters close to a circular shape using a plurality of blades.

The Document discloses an open/close mechanism in which a plurality of diaphragm blades is disposed between a pair of upper and lower ring-shaped boards having an optical-axis aperture at the center, and is opened and closed by a driving unit provided in one of the boards.

Further, Japanese Patent Application Publication No. 2006-322979 (Patent Document 2) discloses an apparatus in which a plurality of diaphragm blades is disposed between boards formed in the shape of a ring, and is opened and closed by a driving unit provided in one of the boards as in Patent Document 1. Such an apparatus is known well that a plurality of blades is disposed around the light-path aperture in the shape of scales, and is opened and closed by a driving unit provided in one of the boards.

Then, in a mechanism for opening and closing a plurality of blades, guide grooves are provided in the board along the trajectory of motion of the blades, pins planted in the blades are fitted into the guide grooves, the blades are rotated in a predetermined direction by a transmission ring provided in the other board, and the motion of the plurality of blades is thereby regulated. In the board for supporting the blades, guide grooves corresponding to the number of blades are disposed around the light-path aperture. The structure of the guide grooves is disclosed in FIG. 4 of Patent Document 1.

DISCLOSURE OF INVENTION

Problems to be Solved by the Invention

As described above, the apparatus that adjusts the level of a quantity of passing light by rotating each of a plurality of blades, which is arranged along the circumference of the optical-axis aperture, a predetermined angle is known in Patent Documents 1, 2 and the like. The structure in this case adopts the mechanism in which a plurality of blade members is axially supported between a pair of upper and lower boards having the optical-axis aperture at the center, and each blade is opened and closed by a driving ring incorporated into between the boards.

Then, the structure is configured so that a plurality of blade members is arranged in the circumferential direction with mutually adjacent end portions overlapped in the shape of scales on the board, and that the aperture diameter is adjusted to be large or small by rotating each of the blade members in the same angular direction by the driving ring.

Accordingly, in a plurality of blade members, mutually adjacent end portions overlap one another, and the overlapping area varies to increase gradually in the close direction (full close direction) of the blades, while varying to decrease gradually in the open direction (full open direction) of the blades. Concurrently therewith, depending on the number of configured blades, there is the case that the number of overlapping blades varies corresponding to the adjusted light quantity.

FIGS. 14 and 15 show a blade structure of 7-blade configuration, and seven blade members 103 are arranged with adjacent end portions overlapped in the circumferential direction between a board 101 and press-down plate 104 having an optical-axis aperture 100. FIG. 14A shows an overlap planar shape of a small aperture state, and FIG. 14B shows the cross-sectional configuration. As shown in FIG. 14B, the blade member 103 overlaps a part of the adjacent blade.

In other words, when blade members of 7-blade configuration are overlapped in the shape of scales, for example, as shown in FIG. 14A, a blade member 103b is in a state of being piled on a blade member 103a, while being inserted in below a blade member 103c, this relationship is also in a seventh blade member 103g that is finally piled, and the blade member 103g is in a state of being piled on a blade member 103f, while being inserted in below the first blade member 103a. This relationship is the same by overlapping blade members of n-blade configuration in the shape of scales.

Therefore, in the blade members disposed to overlap in the shape of scales between the driving ring and the board (base plate), in the small aperture state shown in FIG. 14A, as shown in the cross-sectional configuration of FIG. 14B, three blades, the blade member 103a, blade member 103b and blade member 103c, overlap one another in the circumference portion of the optical-axis aperture 100. Accordingly, a distance (L) between the driving ring 102 and the board 101 is set by the maximum number (n) of overlapping blades, a thickness (s) of the blade member, and clearance (dc) required for open/close action of each blade member. For example, this distance is set so that $L \geq n \cdot s + n \cdot dc$.

However, in the full aperture state as shown in FIG. 15A, as shown in the cross-sectional configuration of FIG. 15B, two blades, the blade member 103a and blade member 103b, overlap one another in the outer region of the optical-axis aperture 100. Thus, in the blade members sandwiched between the board 101 and the driving ring 102, the overlapping area and the number of overlapping blades vary corresponding to the aperture amount of the optical-axis aperture. Therefore, the blade members are arranged with considerable space between the driving ring and the board (base plate), and the following problem arises.

In the driving ring 102 and each blade member 103, a pin-shaped protrusion and a groove hole are respectively provided in one of the ring and member and the other one to engage in each other, and each blade member thereby performs open/close motion by rotation of the driving ring. Concurrently therewith, also in the base plate 101 and each blade member, a pin-shaped protrusion and a groove hole are respectively provided in one of the plate and member and the other one to engage in each other. These two groove holes are formed along the open/close trajectory of each blade to guide.

In such a configuration, the distance between the board (base plate) and the driving ring is set corresponding to the maximum number of overlapping blades, and the maximum number of overlapping blades varies in each blade member corresponding to the aperture amount. Therefore, the blade members are in the configuration that three blade members overlap on the front end portion side on the center side of the optical-axis aperture as shown in FIG. 14B, and that two blade members overlap on the base end portion side as shown in FIG. 15B.

Then, in the case of the small aperture state as shown in FIG. 14A, on the blade member front end portion side on which three blade members overlap, as shown in FIG. 8, each blade member is pushed up by the blade member front end portion of another blade member, warps up from the base end portion toward the blade member front end portion, and is inclined as the blade member 103a of FIG. 15B. Meanwhile, in the case of the full aperture state as shown in FIG. 15A, as shown in FIG. 15A, the blade member is inclined in between the driving ring and the board (base plate) as the blade member 103a of FIG. 15B. The inclination of the blade member changes the engagement state between the pin-shaped protrusion and the groove hole, and causes misalignment of the open/close position of the blade member as shown in FIG. 15C, as a result the aperture diameter changes, and there is the problem that variations occur in the light quantity. Particularly, the effect on variations in the light quantity is significant in the small aperture state.

In view of this problem, it is an object of the present invention to provide a light quantity adjustment apparatus for suppressing the inclination of the blade member, and enabling correct exposure control to be performed with few variations in the light quantity.

Means for Solving the Problem

To attain the above-mentioned problem, in the invention, a plurality of blade members is overlapped and disposed in the shape of scales between a ring-shaped board and a driving ring each having an optical-axis aperture at the center, and each blade member performs open/close motion by the driving ring. At this point, it is a feature that an elastic member facing the plurality of blade members is disposed between the blade members and the board with each blade member pressed against the driving ring side, or an elastic member facing the plurality of blade members is disposed between the blade members and the driving ring with each blade member pressed against the board side, and that the blade members are opened and closed.

By thus configuring, since each blade member is brought near to the board or driving ring side by the elastic member, for example, in the small aperture state, the inclination of each blade member is suppressed which is caused by each blade member being warped up from the base end portion toward the front end portion, and in the full aperture state, the inclination of each blade member is suppressed which is caused by a change in the attitude of the image pickup apparatus. The change in the aperture diameter due to the inclination of the blade member is prevented, and it is made possible to set a correct aperture diameter without fluctuations in the diameter.

As a method of providing the above-mentioned elastic member with an elastic force, adopted is a method of forming the elastic member using a thin plate made of metal or synthetic resin, curving the member by a step portion provided in the board or driving ring, and thereby providing the elastic force for pressing the blade members, or another method of providing the elastic member with a cut raised elastic piece, curving the piece to deform, and providing the elastic force.

Further, first and second pin-shaped protrusions are integrally formed on the frontside and backside of the plurality of blade members, and are fitted into first and second groove holes formed in the board and driving ring. At this point, a third (fourth) groove hole is provided in the elastic member, and is fitted into the pin-shaped protrusion. In this case, the diameter of the groove hole of the elastic member is set at a smaller diameter than the first (second) groove hole.

By this means, the pin-shaped protrusion formed in each blade member is motion-regulated on its base end side by the groove hole of the elastic member, the front end side of the pin-shaped protrusion does not interfere with the first and second groove holes wider than the groove hole, and smooth operation is ensured.

The configuration will specifically be described further. A light quantity adjustment apparatus for adjusting a quantity of light passing through an optical-axis aperture with a plurality of blade members is provided with a ring-shaped board (11) having an optical-axis aperture (12) in the center portion, a plurality of blade members (21) disposed around the optical-axis aperture (12) while overlapping in the shape of scales in the circumferential direction to cover the optical-axis aperture, a driving ring (31) disposed with the plurality of blade members sandwiched between the board and the ring to open and close each blade member, and driving means (M) for rotating the driving ring about the optical-axis aperture. Further, an elastic member (15) facing the plurality of blade members is provided in between the board (11) and the driving ring (31), and it is configured that the elastic member (15) is disposed between the board (11) and the blade members (21) and has an elastic force to press each of the blade members (21) against the driving ring (31) side or is disposed between the driving ring (31) and the blade members (21) and has an elastic force to press each of the blade members (21) against the board (11) side.

Further, the elastic member (15) disposed between the board (11) and the blade members (21) has almost the same shape as the board (11), and in the member is formed a third groove hole in almost the same shape as a first groove hole (13) of the board (11). An elastic member (36) disposed between the driving ring (31) and the blade members (21) has almost the same shape as the driving ring (31), and in the member is formed a fourth groove hole in almost the same shape as a second groove hole (37) of the driving ring (31).

Moreover, to attain the above-mentioned object, a light quantity adjustment apparatus as described in claim 14 of the invention is a light quantity adjustment apparatus comprised of a ring-shaped board having an optical-axis aperture in the center portion, a plurality of blade members disposed around the optical-axis aperture while overlapping in the shape of scales in the circumferential direction to adjust a quantity of light passing through the optical-axis aperture, a driving ring disposed with the plurality of blade members sandwiched between the board and the ring to open and close each blade member, and driving means for rotating the driving ring about the optical-axis aperture, where each blade member of the plurality of blade members is comprised of a base end portion positioned outside the optical-axis aperture having a pair of shafts that respectively engage in the board and the driving ring, and a blade portion that moves forward and backward with respect to the optical-axis aperture to form a diaphragm aperture, and is provided with elastic means for pressing and biasing the base end portion of each blade member to the board side or the driving ring side in between the board and the driving ring.

Advantageous Effect of the Invention

In the invention, when a plurality of blade members is overlapped in the shape of scales on the board having the optical-axis aperture at the center, and is opened and closed along a predetermined open/close trajectory with the driving ring, the elastic member and each blade member are provided to face each other in between the board and the driving ring, the elastic member is configured to press each blade member against the driving ring or board positioned on the side opposite to each blade member, and the invention thereby has the following effects.

For a plurality of blade members overlapping one another, a large gap relative to the overlapping thickness of the blade members is formed in between the board and the driving ring for supporting the blade members to be openable and closable, each blade member is in the gap between the board and the driving ring, the inclination of each blade member is suppressed by the elastic member, for example, when each blade member is warped up from the base end portion toward the front end portion and thus tends to incline in a small aperture state, or when each blade member tends to incline due to a change in the attitude of the image pickup apparatus in a full aperture state, and each blade member to open and close does not incline significantly. Accordingly, misalignment due to the inclination does not occur in the engagement position between the pin-shaped protrusion and the groove holes formed in the blade member, and the board and driving ring, and it is thereby possible to set an aperture diameter by the blade members at a correct value and to make correct light quantity adjustments.

Further, in the invention, in engaging the pin-shaped protrusion and groove holes and coupling in motion the board, the driving ring and the blade members, the third groove hole to engage in the pin-shaped protrusion is provided in the elastic member, and is formed to engage tighter than the first and second groove holes in the board and driving ring. By this means, the pin-shaped protrusion of the blade member is supported in the vicinity of the base end portion by the third groove hole of the elastic member, and it is thereby possible to adjust a quantity of light passing through the optical-axis aperture with an accurate motion trajectory without any error.

Furthermore, the light quantity adjustment apparatus as described in claim 14 of the invention is provided with the elastic means, between the board and the driving ring, for providing the elastic force for biasing the position of each blade member to the board side or the driving ring side while biasing the position of the base end portion of each blade member to the board side or the driving ring side, where each blade member is comprised of the base end portion positioned outside the optical-axis aperture having a pair of shafts that respectively engage in the board and the driving ring, and the blade portion that moves forward and backward with respect to the optical-axis aperture to form a diaphragm aperture, and thereby has the following effects.

For a plurality of blade members overlapping one another, a large gap relative to the overlapping thickness of the blade members is formed in between the board and the driving ring for supporting the blade members to be openable and closable, each blade member is in the gap between the board and the driving ring, the inclination of each blade member is suppressed by the elastic member, for example, when each blade member is warped up from the base end portion toward the front end portion and thus tends to incline in a small aperture state, or when each blade member tends to incline due to a change in the attitude of the image pickup apparatus in a full aperture state, and the base end portion of each blade member to open and close is not inclined significantly. Accordingly, misalignment due to the inclination does not occur in the engagement position between the pin-shaped protrusion and the groove holes formed in a pair of shafts of each blade member, and the board and driving ring, and it is thereby possible to set an aperture diameter by each blade member at a correct value and to make correct light quantity adjustments.

BRIEF DESCRIPTION OF DRAWINGS

FIG. 5 contains explanatory views of a shape of a blade member in the apparatus of FIG. 1, where

FIG. 6 contains explanatory views illustrating the relationship between the driving ring and the blade member, where

FIG. 7 contains explanatory views of action in the Embodiment of FIG. 1, where

FIG. 8 contains explanatory views of action in the Embodiment of FIG. 1, where

FIG. 9 is an explanatory view (center longitudinal cross-sectional view) of a driving unit of the apparatus of FIG. 1;

FIG. 11 contains detailed explanatory views of the Embodiment of FIG. 10, where

FIG. 14 contains explanatory views of conventional techniques, where

FIG. 15 contains explanatory views of conventional techniques, where

FIG. 20 contains explanatory views of a shape of a blade member in the apparatus of FIG. 16, where

FIG. 21 contains explanatory views of action in the Embodiment of FIG. 16, where

FIG. 22 contains explanatory views of action in the Embodiment of FIG. 16, where

FIG. 24 contains explanatory views of action in the Embodiment of FIG. 23, where

FIG. 25 contains explanatory views of action in the Embodiment of FIG. 23, where

BEST MODE FOR CARRYING OUT THE INVENTION

The invention will be described below based on preferred Embodiments shown in the figures.

Figure 1:
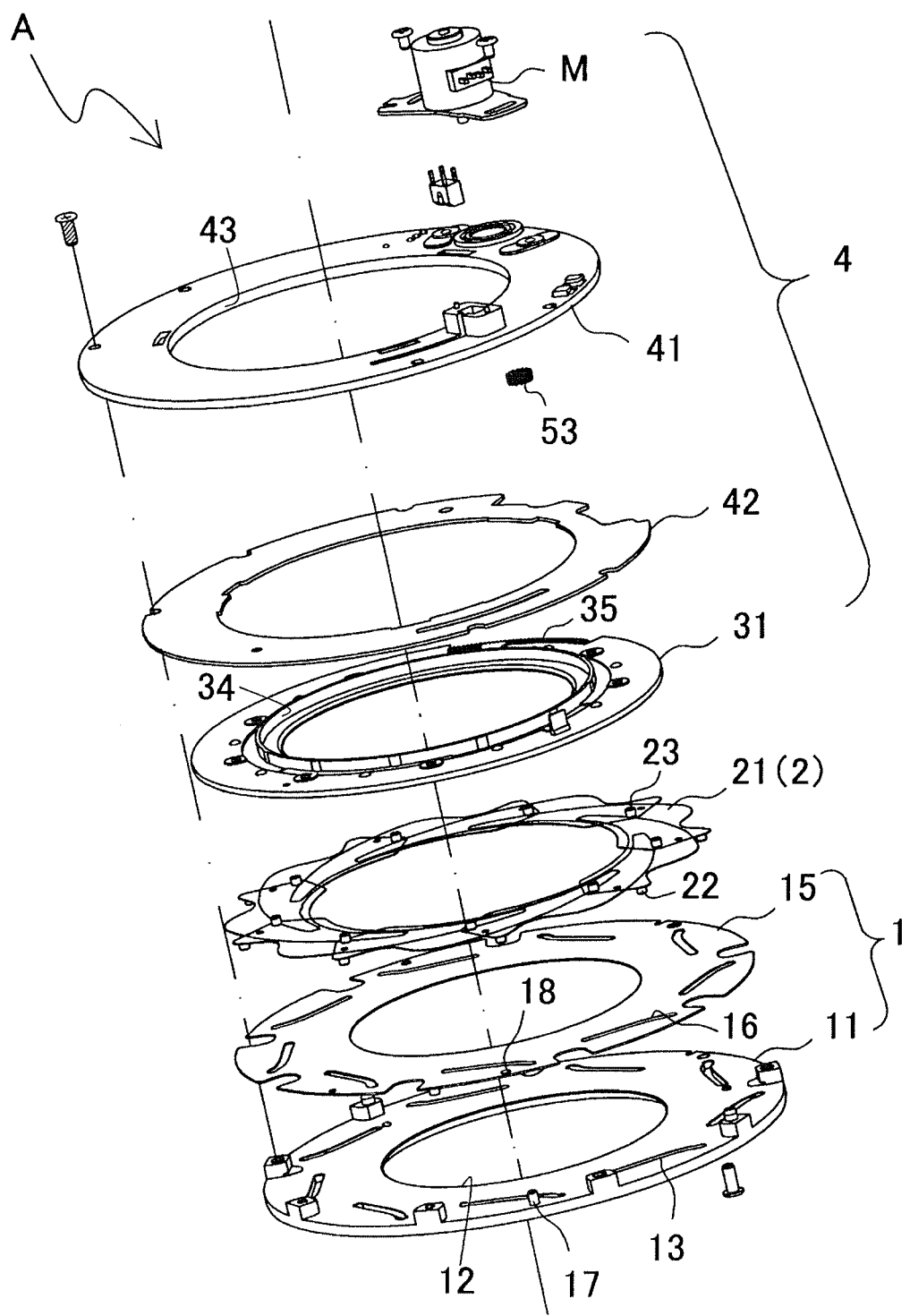
FIG. 1 is an explanatory view of a perspective configuration showing one Embodiment of the invention.

FIG. 1 is an exploded view showing the entire configuration of a light quantity adjustment apparatus A according to the invention. As shown in FIG. 1, the light quantity adjustment apparatus A is comprised of a first board set (base plate set) 1, blade set 2, driving ring 31, and a second board set 4 (hold-down plate).

Then, the blade set 2 is installed in the first board set 1, and the driving ring 31 and the second board set 4 are installed on the blade set 2. Then, a first board 11 and a second board 44 are mutually combined and integrated by fixing means such as screws, and at this point, blade members 21 and the driving ring 31 are supported between both of the boards in the shape of a sandwich.

By such a configuration, an optical-axis aperture 12 is formed in the first board 11 and the second board 41, and the optical-axis aperture 12 is adjusted to a large/small diameter with a plurality of blade members 21a to 21i. Therefore, a driving motor M is mounted on the first board 11 or the second board 41, the driving ring 31 rotates a predetermine angle by rotation of the motor M, and by rotation of the ring, a plurality of blade members 21 shifts by the same amount to adjust the diameter of the optical-axis aperture 12 to be large or small. In addition, the central aperture portion formed in the driving ring 31 is generally set at a larger aperture than the optical-axis aperture 12.

[Configuration of the First Board Set]

Figure 2:
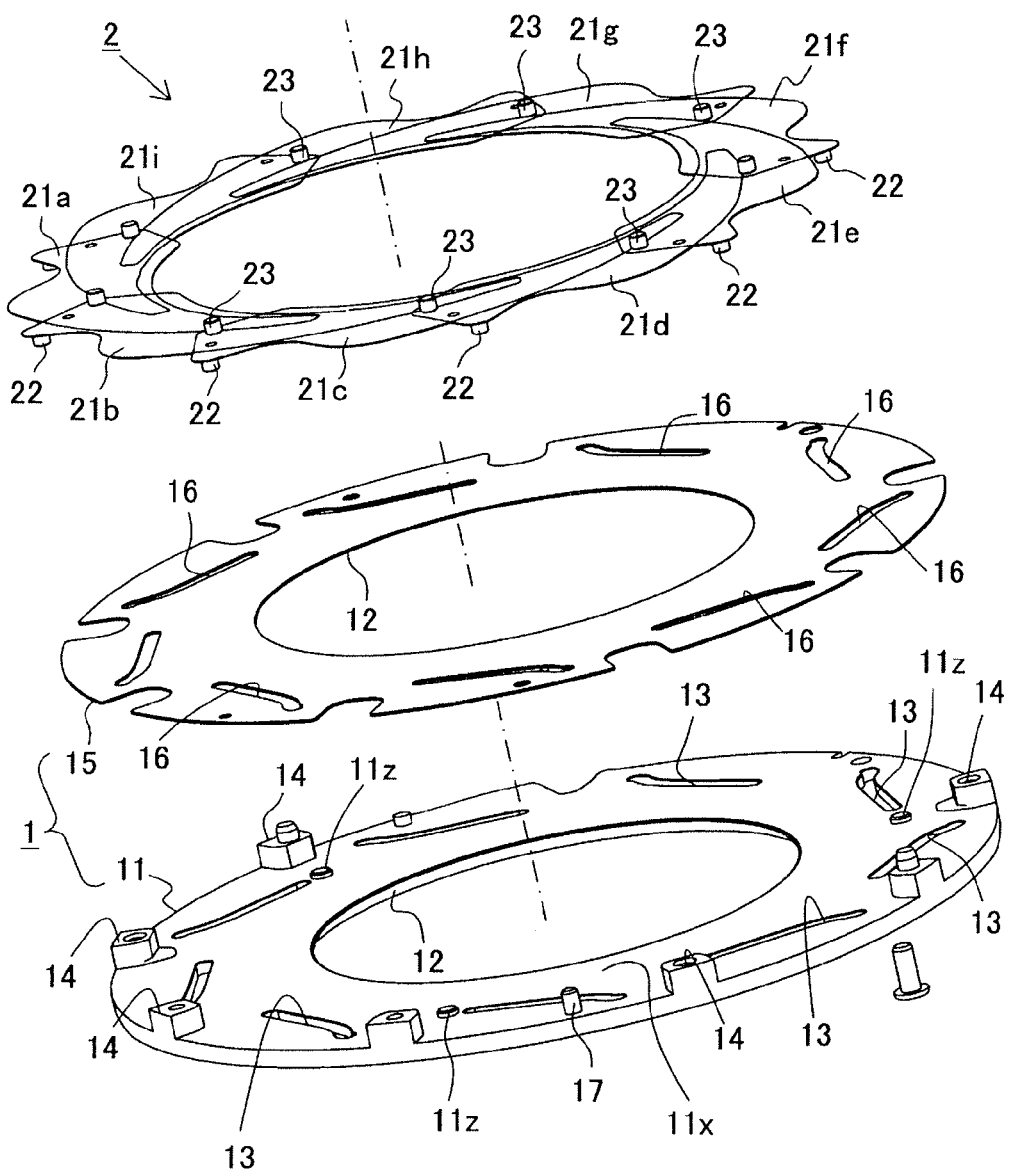
FIG. 2 is an enlarged configuration explanatory view of a first board (a base plate and an elastic member) and a blade set in the apparatus of FIG. 1.

FIG. 2 is an enlarged exploded explanatory view of the first board set 1 and blade set 2 in the exploded view of FIG. 1. The first board set 1 is comprised of the first board 11 and a resin plate (elastic member) 15. Each of the first board 11 (hereinafter, described as a base plate) and the resin plate 15 is formed in the shape of a ring having the optical-axis aperture 12 at the center, and the resin plate 15 is stacked on the base plate 11 in a laminated form. In addition, the material of the plate 15 is not limited to resin, and may be formed of thin metal or the like as long as the plate can be provided with elasticity.

According to FIG. 2, descriptions will be given in order of the base plate (first board) 11 and the resin plate 15.

The optical-axis aperture 12 is formed in the center portion of the base plate 11, and the outside shape of the base plate 11 is configured in a shape corresponding to a barrel shape of an image pickup apparatus (not shown). The base plate 11 is made of metal, synthetic resin or the like, and is formed in material and dimensions suitable for the apparatus board to provide the entire light quantity adjustment apparatus A with toughness.

Around the optical-axis aperture 12 is formed a blade support surface 11x (flat surface or a projection guide surface) that supports blade members 21, described later. In the blade support surface 11x and each blade member 21, described later, a first pin-shaped protrusion 22 is provided in one of the surface and member, and a first groove hole 13 (hereinafter, described as a guide groove) to engage in the protrusion is provided in the other one.

The pin-shaped protrusion 22 and the guide groove 13 are fitted into each other to open and close the blade member 21 along the groove hole in a predetermined trajectory. In each blade member 21 and the driving ring 31, described later, a second pin-shaped protrusion 23 is formed in one of the member and the ring, and a second groove hole 33 is formed in the other one.

In the apparatus (one Embodiment) as shown in FIG. 2, the first pin-shaped protrusion 22 on the side facing the base plate 11 and the second pin-shaped protrusion 23 on the side facing the driving ring 31 are formed integrally in the blade member 21, described later. Then, the first groove hole (guide groove) 13 is formed in the base plate 11, the second groove hole 33 is formed in the driving ring 31, the first pin-shaped protrusion 22 is fitted into the hole 13, and the second pin-shaped protrusion 23 is fitted into the hole 33. Further, the first groove hole 13 is formed of a slit groove (hereinafter, described as a "guide groove") along the open/close trajectory of the blade member 21. This first groove hole 13 is not a through groove hole so that light coming from the base plate 11 side does enter inside the light path through the first groove hole 13, and is to prevent unnecessary light.

[Configuration of the Base Plate]

The base plate 11 as shown in FIG. 2 is formed by mold forming of a synthetic resin. In this case, glass fibers are mixed in providing the base plate with toughness, and carbon fibers or the like are mixed in charging the electrostatic property. By thus forming with a synthetic resin, even in the complicated shape, processing is easy, and it is possible to perform manufacturing at low cost.

Concurrently therewith, it is possible to make the base plate as an apparatus board lightweight. Examples of the synthetic resin are epoxy resins rich in heat resistance, glass-fiber reinforced resins rich in toughness and carbon-fiber mixed resins rich in conductivity, and the resins are used corresponding to the application.

Thus, in terms of making the plate thin, small in size, lightweight and the like, it is preferable to manufacture the base plate 11 by mold forming of a synthetic resin. Further, in terms of durability, conductivity and the like, desired characteristics are obtained by mixing reinforcement fibers, conductive fibers or the like into the resin.

On the other hand, by forming the board (base plate) with a synthetic resin, there are problems that processing accuracy deteriorates, and that frictional resistance increases because surface roughness degrades by mixed fibers. The invention is characterized in that the problems were solved by "providing the elastic member in between the base plate and the blade members" as described below.

Configuration of the Elastic Member

Embodiment 1

Embodiment 1 according to the invention is characterized by providing the resin plate 15 (elastic member) in between the base plate 11 and the blade members 21, described later, instead of directly mounting the blade members 21 on the base plate 11 to support, and the configuration will be described below.

Figure 4A:
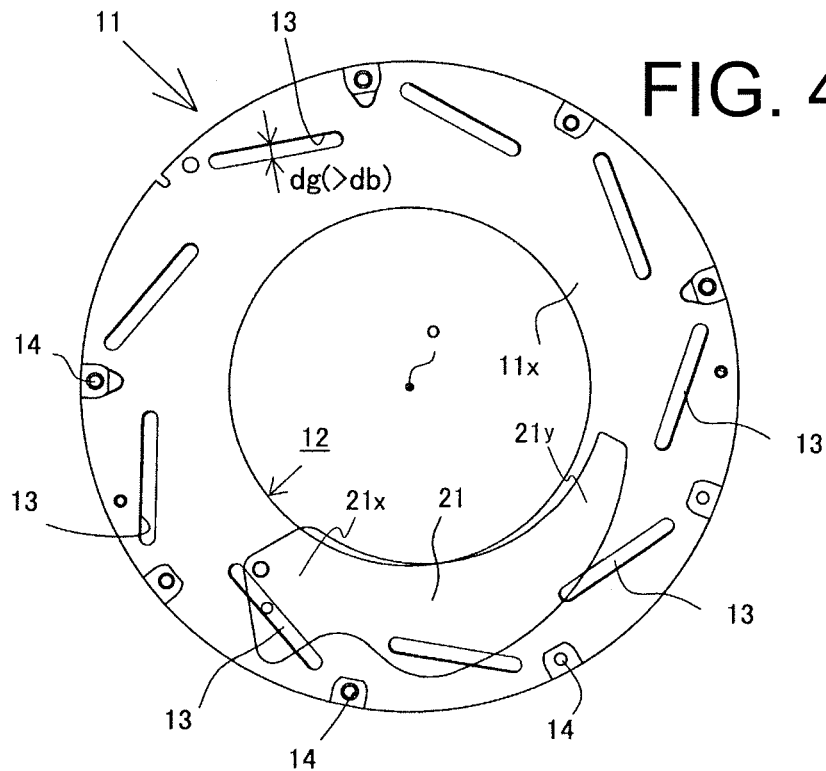
FIG. 4A is an explanatory view showing a shape of the first board (base plate) in the apparatus of FIG. 1.
Figure 4B:
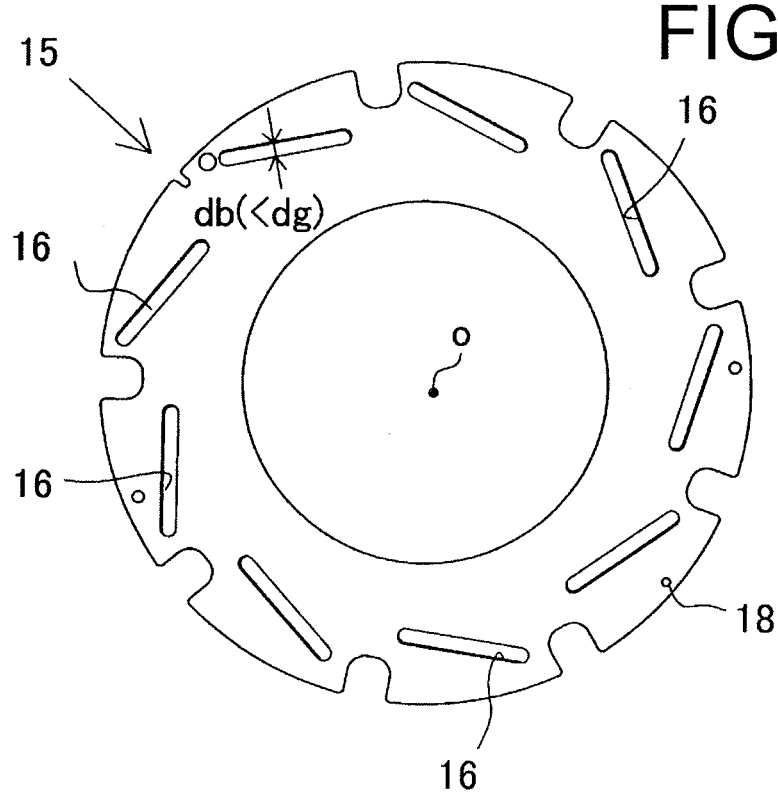
FIG. 4B is an explanatory view showing a shape of the elastic member.

As shown in FIG. 2 showing the perspective structure and in FIG. 4B showing the planar structure, the resin plate 15 is formed in the shape of a ring that is approximately the same shape as the base plate 11. This ring shape is a shape for enabling each blade member 21 to be pressed uniformly while being easy to process, and therefore, is the best shape, but instead of the ring shape, the plate may be in a non-ring shape for enabling each blade member 21 to be pressed uniformly.

Figure 7A:
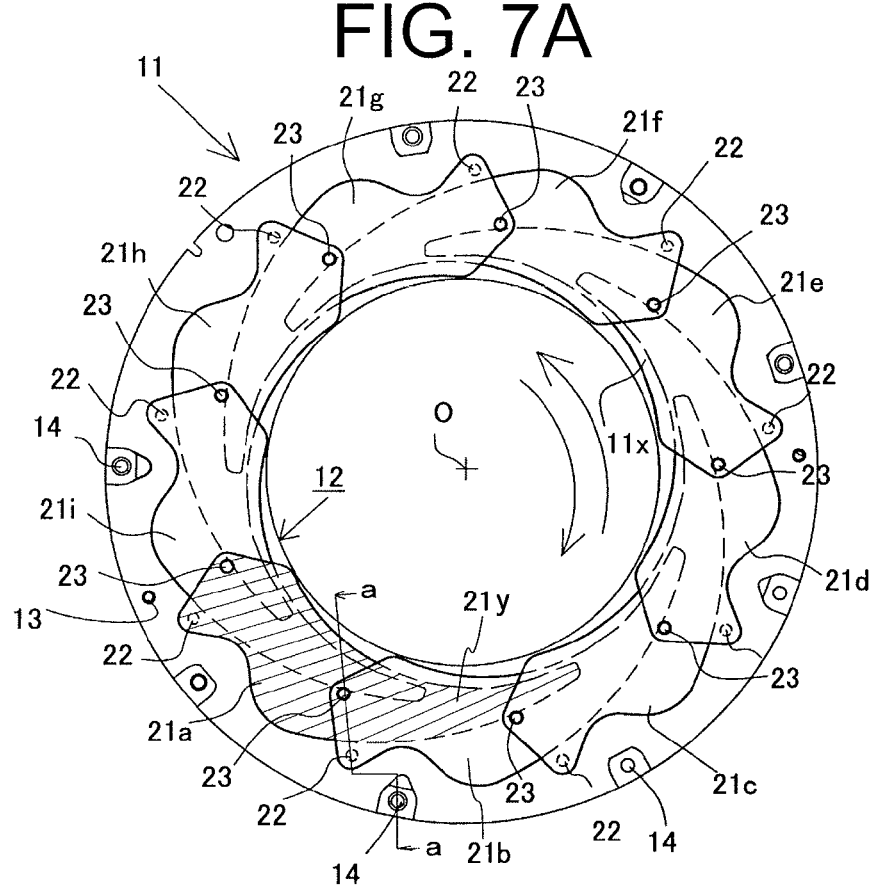
FIG. 7A is an explanatory view of an overlapping state when blade members are in a full aperture state (full aperture diameter)
Figure 7B:
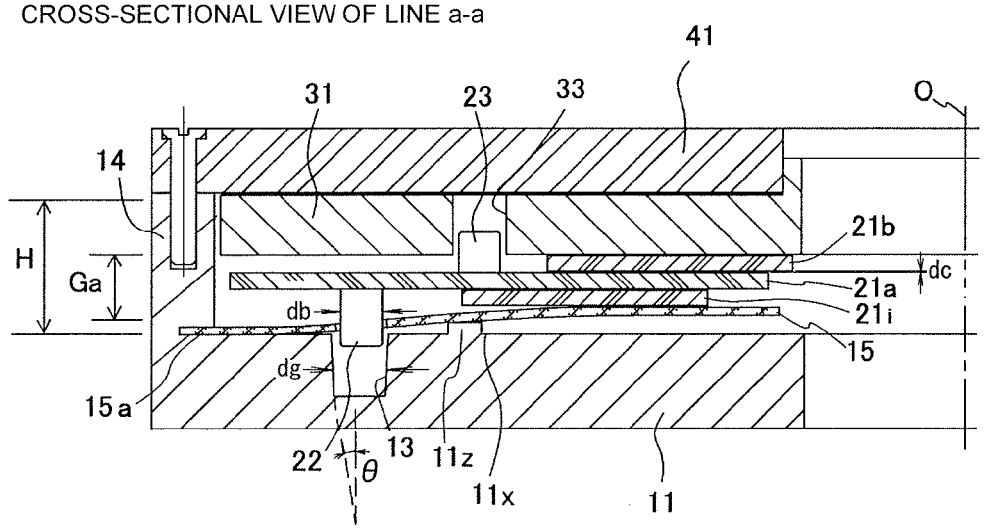
FIG. 7B is an explanatory view of the section state (cross-sectional view of the line a-a of FIG. 7A)

As shown in FIG. 7B showing the sectional structure, the resin plate 15 is provided between the blade support surface 11x of the base plate 11 and blade members 21, and prevents the blade members 21 from directly coming into contact with the base plate 11. The resin plate 15 shown in the figure is formed approximately in the same planar shape as the base plate 11.

The resin plate 15 is formed of a resin film with a low coefficient of friction with respect to the blade members 21, described later. The resin plate 15 shown in the figure is made of the same material as the blade members 21, described later, and for example, is formed by die-cutting forming of a polyethylene resin film (PET sheet).

Then, as the shape is shown in FIG. 4B, in the plate 15 are formed guide grooves 16 coincident with the guide grooves 13 of the base plate 11. The guide grooves 16 will be described later.

Accordingly, when the base plate 11 is formed by mold forming using a resin, and the resin plate 15 is formed by die-cutting forming using a resin film, it is possible to form the resin plate 15 with a high degree of shape accuracy as compared with shape accuracy of the base plate 11. This is because dimension accuracy is obtained by performing die-cutting forming on a material formed in the shape of a sheet by roll forming, as compared with mold forming by pouring a melted resin into a forming mold.

Further, by making the material of the resin plate 15 the same as the material of the blade members 21, temperature characteristics such as a thermal change are substantially the same as the blade members, the blade members 21 and resin plate 15 are of the same material and have the same electrification rank, and therefore, static electricity is not charged when both of the member and the plate slide.

The resin plate 15 shown in the figure is formed approximately in the same shape as the base plate 11, supports base end portions 21x of a plurality of blade members 21 around the optical-axis aperture 12 positioned at the center, and supports front end portions 21y to face the inside of the optical-axis aperture.

[Relationship Between the Guide Groove and the Guide Pin]

Described next is the relationship between the guide groove 13 formed in the above-mentioned base plate 11 and the guide groove 16 formed in the resin plate 15, and the guide pin (first pin-shaped protrusion) 22 formed in each blade member 21.

As shown in FIG. 7B, the guide groove 13 of the base plate 11 is comprised of a concave groove and is formed in the shape of a blind hole which light outside the base plate does not pass through. Further, in relation to the fact that the base plate 11 is formed by mold forming, a cutting taper 8 is formed, and the average dimension of the groove width is set at dg.

Further, the guide groove 16 of the resin plate 15 is formed of a through hole with a groove width of db which is narrower than the groove width dg of the base plate 11 and enables the guide pin 22 to move in the slit groove without being held. The through hole is formed in a uniform diameter by die-cutting forming using a resin film.

Meanwhile, the guide pin 22 is planted in each of the blade members 21a to 21i, and the outside diameter of the pin is set at da. Then, the relationship between the pin outside diameter da, the groove width dg of the guide groove 13 of the base plate 11 and the groove width db of the guide groove 16 of the resin plate 15 is set at the relationship of da≤db□dg.

In other words, the guide groove 16 of the resin plate 15 has a narrower width (db<dg) than that of the guide groove 13 of the base plate 11, and is set at a dimension (da≤db) adapted to the guide pin outside diameter da.

Accordingly, as shown in the figures, the base end portion of the guide pin 22 (first protrusion) plated in each of the blade members 21a to 21i engages in the guide groove 16 of the resin plate 15, and is regulated in motion, and the front end portion of the guide pin 22 (first protrusion) does not come into contact with the guide groove 13 of the base plate 11.

Therefore, it does not happen that the guide pin (first protrusion) 22 engages in the guide groove 13 of the base plate 11 having the taper G unstably, and each of the blade members 21a to 21i operates smoothly.

Then, the first board set 1 comprised of the base plate 11 and the resin plate 15 forms a gap Ga (see FIG. 8B) in between the set and the driving ring 31, and the blade members 21 are supported movably.

The invention is characterized by providing the resin plate 15 with an elastic force to press each blade member 21 against the driving ring 31 side. Therefore, the resin plate 15 is formed of a plastic film having the elastic force, and the plate as shown in the figure is formed of the polyethylene resin film as described previously.

Figure 8A:
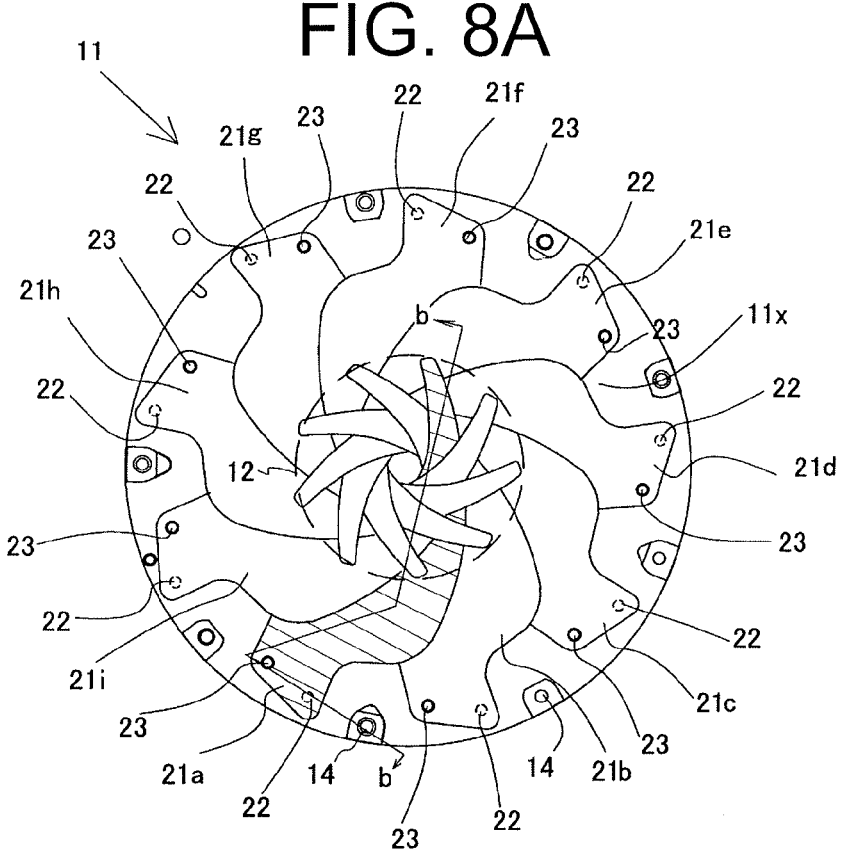
FIG. 8A is an explanatory view of an overlapping state when blade members are in a small aperture state (minimum aperture diameter)
Figure 8B:
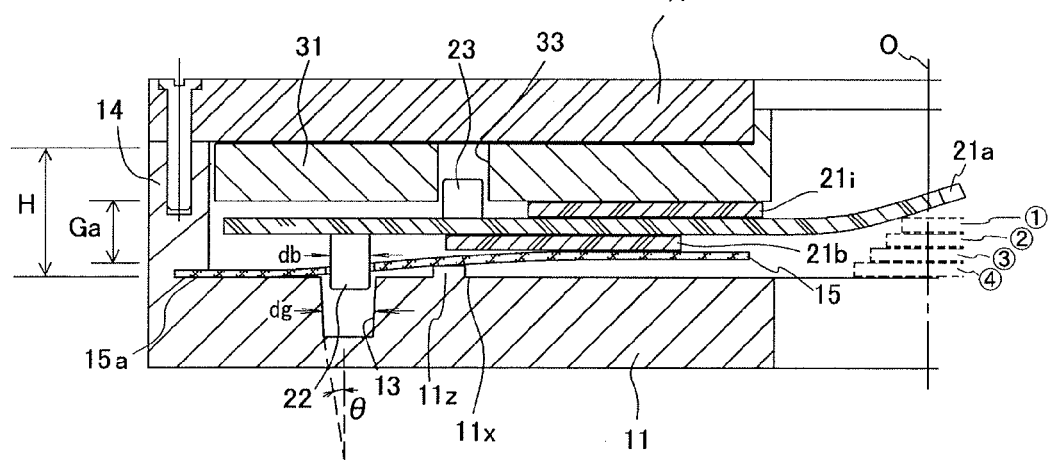
FIG. 8B is an explanatory view of the section state (cross-sectional view of the line b-b of FIG. 8A)

Then, as shown in FIGS. 2 and 8B, in the base plate 11 are formed step portions 11z to curve the resin plate 15. In the plate as shown in the figure, the step portions 11z are formed by forming protrusions in the blade support surface 11x of the base plate 11. In addition, the same number of step portions 11z is disposed corresponding to the configuration number of blade members 21 described later, or the lower number of portions 11z (three portions) than the number of blades (nine-blade configuration) is disposed as shown in the figure, and the step portions 11z are thus disposed according to the motion trajectory of the blade. Further, the step portions 11z are not limited to the shape as shown in the figure, and may be in the shape of a mountain. Further, instead of forming the step portions 11z as in the Embodiment, the resin plate 15 may be beforehand curved and formed, and thus, it is only essential that the elastically deformed resin plate 15 has the elastic force for pressing the blade members 21 as a result. In addition, in installing the resin plate 15 in the first board set 1, it is desirable to provide the elastic force by fixing one end 15a (end portion on the outer side) of the resin plate 15 to rise by the step portions 11z and curving the resin plate 15.

[Blade Member]

Figure 5A:
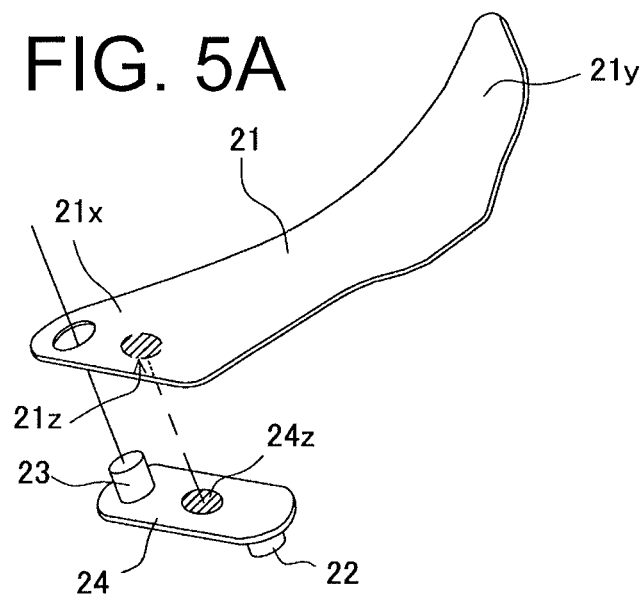
FIG. 5A is an explanatory view of an exploded state of the blade member.

FIG. 5 shows an example of a blade shape, and the base end portion 21x is supported by the base plate 11 through the above-mentioned resin plate 15. Further, the front end portion 21y of the blade member opens and closes the optical-axis aperture 12. At this point, front end portions 21x of a plurality of blade members overlap one another in the shape of scales and are in a shape of forming iris diaphragm inside the light-path diameter 12 in the shape of a circle.

In addition, as described previously, each blade member 21 engages in the base plate 11 and the driving ring 31 with the pin-shaped protrusion in one and the shaft hole in the other one, and performs open/close motion along the groove hole (guide grooves 13, 16) by rotation of the driving ring 31. For example, the blade member is formed by die-cutting forming of a polyethylene film (PET film).

Figure 5B:
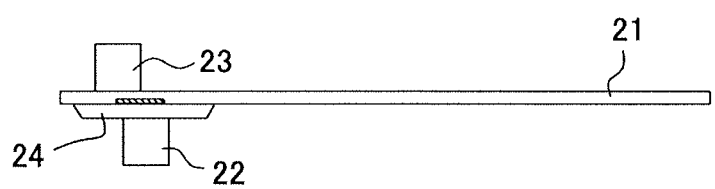
FIG. 5B is an explanatory view of a cross-sectional configuration of the blade member.

In each of the blade members 21a to 21i shown in the figure, as shown in FIG. 5B, the first pin-shaped protrusion (guide pin) 22 and the second pin-shaped protrusion (operating pin) 23 are planted on the frontside and backside of an attachment 24. The guide pin 22 is disposed in a position facing the base plate 11 side in each blade member, and the operating pin 23 is disposed on the opposite surface (the second board side, described later). "24z" shown in the figure denotes a welding surface, and "21z" denotes a melted surface.

Then, the guide pin 22 is fitted into the guide groove 13 of the base plate 11, and the guide groove 16 of the resin plate 15 as described later, and the operating pin 23 is fitted into the second groove hole 33 of the driving ring 31, described later.

[Configuration of the Second Board Set]

The second board set 4 will be described according to FIG. 3. The second board set 4 is comprised of a hold-down plate 41, a reinforcing plate 42, driving ring 31, and a driving unit M secured to the hold-down plate 41. Each configuration will be described below.

[Hold-Down Plate]

Figure 3:
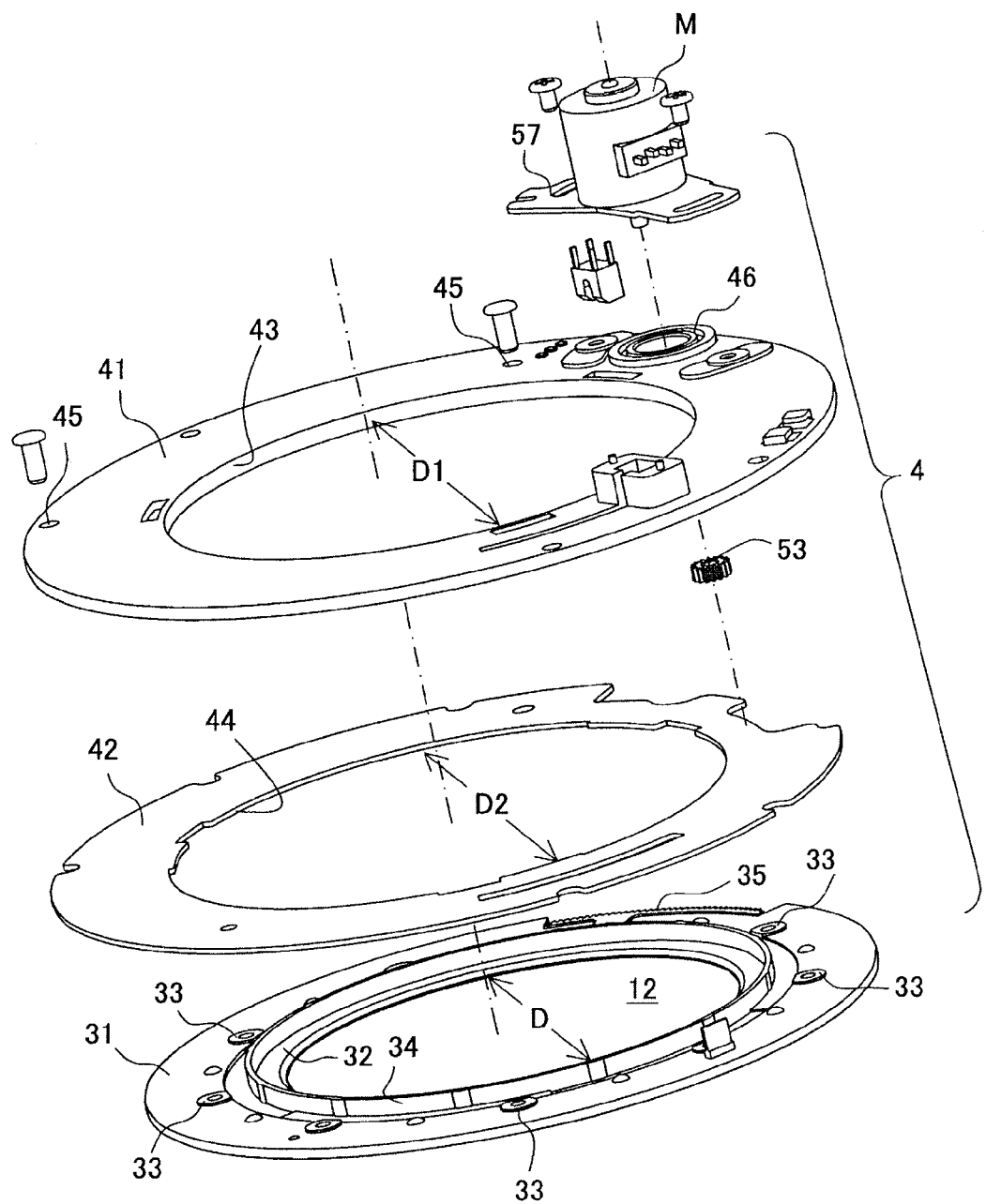
FIG. 3 is an enlarged configuration explanatory view of a second board (a hold-down plate and a driving ring) in the apparatus of FIG. 1.

As shown in FIG. 3, the hold-down plate 41 is formed in the shape of a ring having an aperture 43 in the center portion, and is formed approximately in the same shape as the above-mentioned base plate 11. The hold-down plate 41 shown in the figure is of mold forming using a resin, and a mount 46 of the driving unit M is provided in a part of the outer region. In the mount 46, the driving unit M, described later, is fastened with screws or the like. "45" shown in the figure denotes a coupling hole to fasten the hold-down plate 41 to a coupling protrusion 14 of the base plate 11 with a screw.

[Reinforcing Plate]

As shown in FIG. 3, the reinforcing plate 42 is comprised of a relatively strong plate material such as metal, and reinforces the hold-down plate 41 made of a resin. Accordingly, when sufficient strength is obtained in the hold-down plate 41, it is possible to eliminate the reinforcing plate 42. The reinforcing plate 42 is formed approximately in the same shape as the hold-down plate 41, and an aperture 44 is formed at the center.

Each of the aperture 43 of the hold-down plate 41 and the aperture 44 of the reinforcing plate 42 is set to be larger than the aperture diameter D of the optical-axis aperture 12, and the aperture diameter D1 of the aperture 43, the aperture diameter D2 of the aperture 44 and the aperture diameter D of the optical-axis aperture 12 are set at $D2 \geq D1 \square D$.

[Driving Ring]

As shown in FIG. 3, the driving ring 31 is formed in the shape of a ring (hereinafter, referred to as the "driving ring") having the optical-axis aperture 12 in the center portion, for example, by mold forming using a resin. The driving ring 31 is attached rotatably to the hold-down plate 41 via the reinforcing plate 42.

Therefore, in the driving ring 31, a fringe 32 and engagement protrusion 34 are formed around the optical-axis aperture 12. The fringe 32 is fitted into the aperture 43 of the hold-down plate 41 and the aperture 44 of the reinforcing plate 42, and rotates about the rotation center coinciding with the center of the optical-axis aperture 12. Further, the engagement protrusion 34 is formed on the surface that comes into slide-contact with the reinforcing plate 42, and helps both members to slide smoothly.

The driving ring 31 is incorporated into the hold-down plate 41 to be rotatable as described above, and passive teeth 35 are formed in a part of the circumference. The passive teeth 35 are provided in a position to mesh with a driving gear 53 of the driving unit M, described later, attached to the mount 46 of the hold-down plate 41.

In the driving ring 31, the second groove hole 33 that is fitted into the operating pin (second pin-shaped protrusion) 23 planted in each of the blade members 21a to 21i is provided around the optical-axis aperture 12. The second groove hole 33 is disposed in a plurality of portions (in the figure, nine portions) around the optical-axis aperture 12 corresponding to the number of blade members 21.

In such a configuration, the driving ring 31 is supported by the hold-down plate 41 rotatably, and rotates a predetermined angle by the driving gear 53 of the driving unit M. Then, rotation of the driving ring 31 is conveyed to each of the blade members 21a to 21i.

[Configuration of the Driving Unit]

FIG. 9 shows one Embodiment of the driving unit M. The driving unit M in FIG. 9 is the so-called pulse motor comprised of a magnet rotor 50 magnetized in multipole (for example, eight poles), a plurality (for example, "12") of stator coils 51, driving rotating shaft 52, driving gear 53, and yoke 54. The magnet rotor 50 is configured by integrating the driving rotating shaft 52 and permanent magnets 56, and the stator coils 51 made by winding coils 58 around cores 55 are provided at equal intervals around the magnet rotor 50 with the driving rotating shaft 52 therebetween. In the permanent magnets 56, NS poles are formed in multipole magnetization around the periphery, and the driving gear 53 is attached to the driving rotating shaft 52.

Thus configured driving unit M is fastened in a bracket 57 to the mount 46 of the hold-down plate 41 with screws or the like. Then, the driving gear 53 meshes with the passive teeth 35 of the driving ring 31. By this means, the driving ring 31 reciprocates by a predetermined angle in a clockwise direction and counterclockwise direction in FIG. 3, and opens and closes the diaphragm blades 21.

[Explanation of the Assembly State]

The apparatus of FIG. 1 shows the case of assembling the blade set 2, driving ring 31, and then, the second board set 4 on the first board set 1 in this procedure. As shown in FIG. 1, the driving unit M is fixed to the hold-down plate 41 with screws or the like. Then, the base plate 11 is set on a workbench, and the resin plate 15 is installed on the base plate. Next, each of the blade members 21a to 21i is overlapped on the first board set 1.

At this point, the guide pin (first pin-shaped protrusion) 22 of each blade member 21 is stored inside the guide groove 13 of the base plate 11. At this point, adjacent ends of respective blade members of the predetermined number of blade members 21 are overlapped and arranged around the outer periphery of the optical-axis aperture 12 in the shape of scales in order of the first blade 21a, the second blade 21b and the third blade 21c. Then, when the nth (ninth blade) blade member 21i to finally overlap is overlaid on the n–1th blade member, the front end portion 21y of the blade member is inserted below the base end portion 21x of the first blade member 21a.

By thus assembling the blade set 2, in all blade members 21 of the first to nth blade members 21a to 21i, one of opposite end edges in the circumferential direction is laid on the adjacent blade member, the other one is laid under the adjacent blade member, and the blade members are piled in the so-called scales shape.

Then, the driving ring 31 is mounted on the blade set 2. At this point, the operating pin 23 (second pin-shaped protrusion) of each blade member is fitted into the groove hole 33 of the driving ring 31. Next, the second board set 4 is mounted to be rotatable about the optical-axis aperture 12. At this point, the engagement protrusion 34 of the driving ring 31 is inserted in the aperture 43 of the hold-down plate 41 so that the driving gear 53 of the driving unit M and the passive teeth 35 of the driving ring 31 mesh with each other, and the driving ring 31 is installed in the hold-down plate 41 rotatably.

Then, the base plate 11 and the hold-down plate 41 are fixed with fixing means such as screws. By this means, the light quantity adjustment apparatus A is assembled as a unit such that the first board (base plate) 11, blade set 2 (blade members 21), driving ring 31, and second board (hold-down plate) 41 are integrated.

By such overlapping of the blade members, when the optical-axis aperture is the maximum diameter, as shown in FIG. 7A, each blade member rotates outside the optical-axis aperture 12 of the base plate. In narrowing to the minimum diameter, as shown in FIG. 8A, the front end portions 21y of respective blade members piled in the shape of scales support one another, and thereby maintain the almost parallel position to the plane of the optical-axis aperture 12 without being supported by the base plate. At this point, the front end portion 21y of each of the blade members 21a to 21i is warped to the base plate 11 side by other front end portions, each of the blade members 21a to 21 normally warps up from the base end portion 21x to the front end portion 21y, and the base end portion 21x is inclined in the distance L between the base plate 11 and the driving ring 31. However, the base end portion 21x is pressed against the driving ring 31 side by the elastic force of the resin plate 15, and therefore, is kept in the almost parallel state in the distance L between the base plate 11 and the driving ring 31.

[Another Explanation of the Assembly State]

Described is another method of the above-mentioned assembly method. In the above-mentioned assembly method, the apparatus is assembled using a dedicated workbench. In contrast thereto, this assembly method does not require a dedicated workbench to assemble, and is a method of assembling the apparatus as shown in FIG. 1 upside down, and the driving ring 31, the blade set 2, and then, the first board set 1 are mounted on the second board set 4 in this procedure. The description is given using FIG. 1. The driving unit M is first fixed to the hold-down plate 41 with screws or the like, and from above, the engagement protrusion 34 of the driving ring 31 is fitted into the aperture 43 of the hold-down plate 41. The engagement protrusion 34 of the driving ring 31 is inserted in the aperture 43 of the hold-down plate 41 so that the driving gear 53 of the driving unit M and the passive teeth 35 of the driving ring 31 mesh with each other, and the driving ring 31 is installed in the hold-down plate 41 rotatably. Then, the second board set 4 is set on a workbench, and the blade set 2 comprised of the blade members 21a to 21i is overlaid on the driving ring 31.

At this point, while the operating pin 23 (second pin-shaped protrusion) of each blade member is fitted into the groove hole 33 of the driving ring 31 around the outer periphery of the optical-axis aperture 12, the blade member 21a is laid, next the blade member 21b is piled so that the blade member 21a is below, subsequently the blade members 21c to 21i are piled upward successively, finally the portion of the blade member 21i adjacent to the blade member 21a is inserted below the blade member 21a, and the blade members are thus arranged in the shape of scales. By this means, in all blade members 21 of the first to nth blade members 21aa to 21i, one of opposite end edges in the circumferential direction is laid on the adjacent blade member, the other one is laid under the adjacent blade member, and the blade members are piled in the so-called scales shape.

Next, the resin plate 15 is installed from above the blade set 2 so that the guide pin (first pin-shaped protrusion) 22 of each blade member 21 is stored inside the guide groove 13 of the base plate 11, the base plate 11 is similarly overlaid from above, and the first board set 1 is assembled.

Then, the base plate 11 and the hold-down plate 41 are fixed with fixing means such as screws. By this means, it is also possible to assemble the light quantity adjustment apparatus A as a unit such that the first board (base plate) 11, blade set 2 (blade members 21), driving ring 31, and second board (hold-down plate) 41 are integrated.

[Open/Close Action of the Blade Members]

Figure 5C:
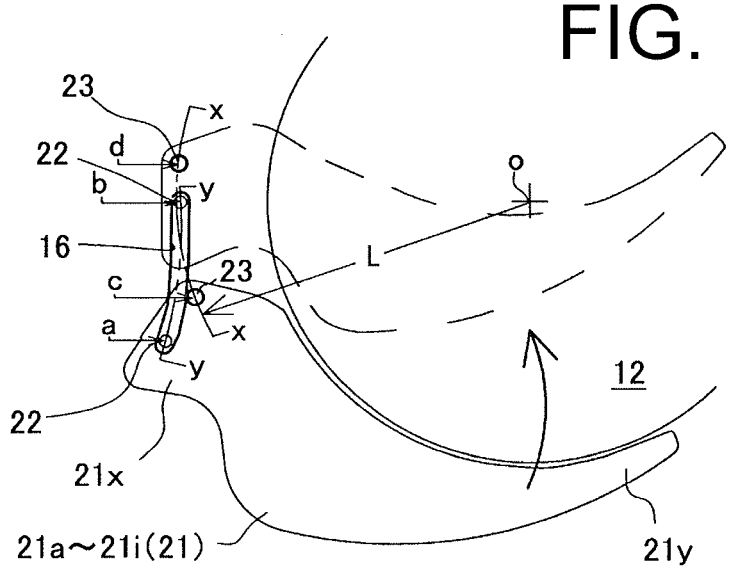
FIG. 5C is an explanatory view of an open/close trajectory of the blade member.
Figure 6A:
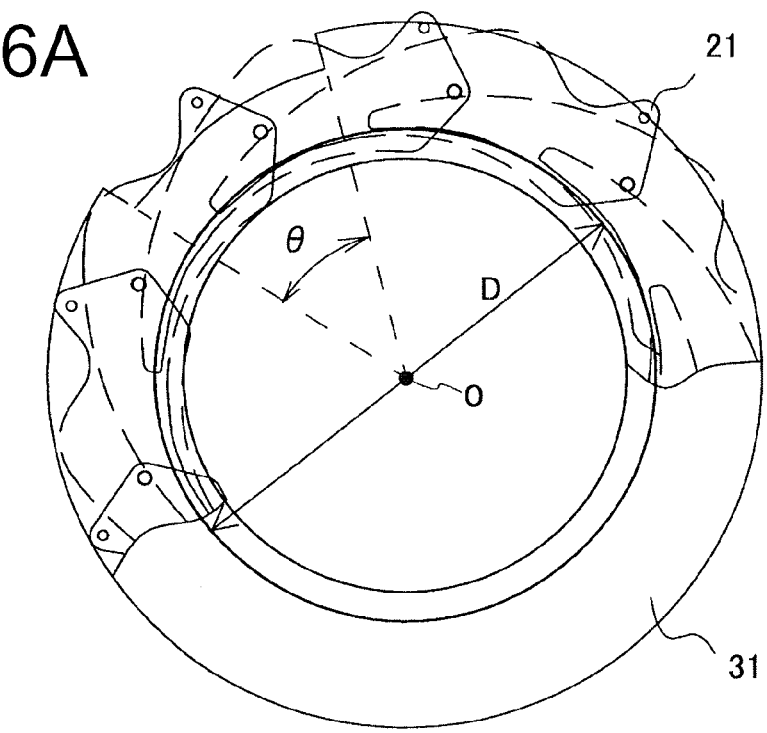
FIG. 6A is an explanatory view of the entire shape of the driving ring.

The open/close action of the blade members will be described next according to FIGS. 5 and 6. FIG. 6A shows a full aperture state in which a plurality of blade members 21 is disposed around the optical-axis aperture 12, and FIG. 6B shows the open/close action state of one of a plurality of blade members 21.

As shown in FIG. 6A, a plurality of blade members 21 is arranged in positions (in the apparatus shown in the figure, nine blades in positions angularly spaced every 40 degrees ($\theta$=40°)) spaced a predetermined angle with reference to the light-path center O in the shape of scales.

In each blade member 21, the guide pin 22 (first pin-shaped protrusion) is fitted into the guide groove 13 (first groove hole) formed in the base plate 11. Concurrently therewith, the operating pin 23 (second pin-shaped protrusion) formed in each blade member 21 is fitted into the groove hole (fit hole) 33 of the driving ring 31.

Figure 6B:
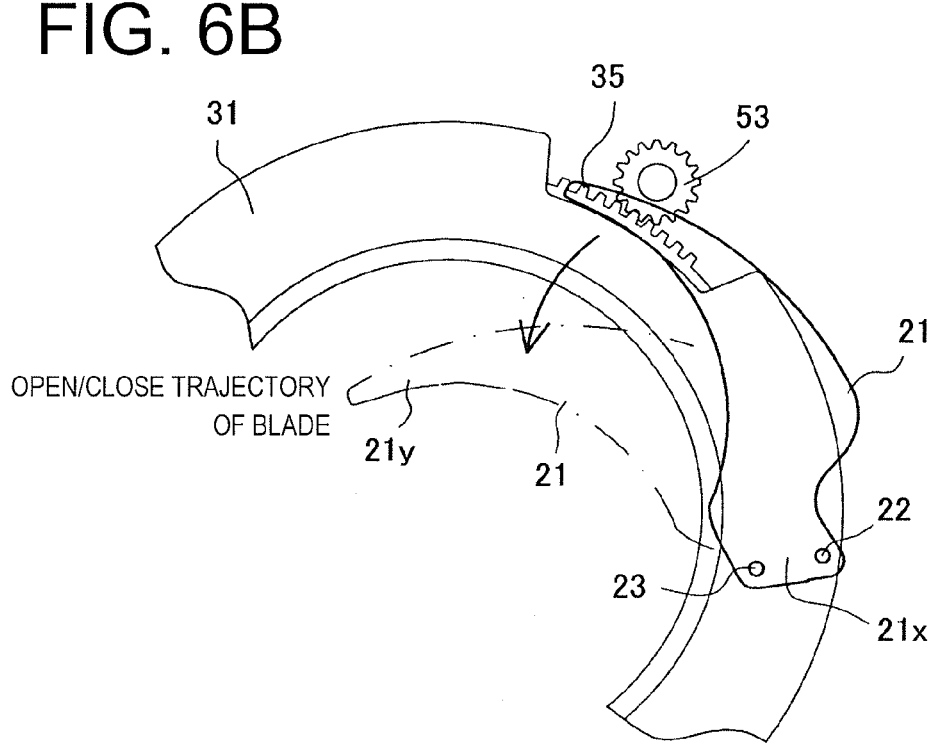
FIG. 6B is an enlarged explanatory view of principal part of the driving ring.

As shown in FIG. 6B, the driving ring 31 rotates about the light-path center O in a clockwise direction and a counter-clockwise direction in the range of a predetermined angle by the driving unit M described previously. At this point, as shown in FIG. 5C, the operating pin 23 rotationally shifts from point c to point d shown in the figure in a clockwise direction in FIG. 5C by the arc trajectory x-x with a radius L from the light-path center O shown in the figure by rotation of the driving ring 31. Further, the guide pin (first protrusion) 22 shifts from point a to point b by the trajectory y-y shown in the figure along the guide groove 16.

By the shifts of the operating pin (second protrusion) 23 and the guide pin (first protrusion) 22, the blade member 21 is opened and closed from the full aperture state shown by the solid line to the small aperture state shown by the dashed lines. Accordingly, corresponding to the current supplied to the driving unit M, the blade members 21 are opened and closed in arbitrary aperture diameters between the small aperture state and the full aperture state, and adjust the quantity of light passing through the optical-axis aperture 12 to be large and small.

[Explanation of the Action]

The action of the apparatus as shown in FIG. 1 will be described next according to FIGS. 7 and 8.

The light quantity adjustment apparatus A is assembled in a laminated form by stacking the base plate 11, resin plate 15, blade members 21, driving ring 31, and hold-down plate 41 in this order, and the base plate (first board) 11 and hold-down plate (second board) 41 are secured with fixing means such as screws.

In this state, the gap Ga between the resin plate 15 and the driving ring 31 is set at a height of the coupling protrusion 14 (which may be provided in the second board) provided in the base plate 11 (see FIG. 7B). The height (H) of the coupling protrusion is set so that [H=t1+t2+t3·m+dc·m], assuming that the thickness of the resin plate 15 is t1, the thickness of the driving ring 31 is t2, the thickness of the blade member is t3, the maximum number of overlapping blade members is m, and that action clearance among the blade members is dc.

Under such conditions, when the blade members 21 undergo open/close motion from the full aperture state of FIG. 7A to the small aperture state of FIG. 8A, in between the resin plate 15 and the driving ring 31, as shown in FIG. 7A, three members are piled on each of the blade members 21a to 21i in the full aperture state, and as shown in FIG. 8A, three members are inserted below each of the blade members 21a to 21i in the small aperture state.

For example, when the blades are in the full aperture state as shown in FIG. 7A, the base end portion of the blade member 21b is overlaid on the front end portion 21y of the blade member 21a, the base end portion of the blade member 21c is overlaid on the member 21b, and two members are overlaid. Meanwhile, when the blade members are in the small aperture state as shown in FIG. 8A, while a single member, the blade member 21b, exists below the base end portion 21x of the blade member 21a, the front end portion of the blade member 21b is inserted below the front end portion 21y of the blade member 21a, the front end portion of the blade member 21c is inserted below the member 21b, and further, the front end portion of the blade member 21d is inserted below the member 21c. Accordingly, in the vicinity of the outer edge of the optical-axis aperture 12 of the base plate 11, about three blade members 21 are overlapped at minimum.

From this respect, the gap Ga between the resin plate 15 and the driving ring 31 is the sum [Ga=t3·n+dc·n] of the product of the thickness (t3) of the blade members and the number (n) of overlapping blades and the product of the action clearance (dc) among the blade members and the number (n) of overlapping blades.

Accordingly, when the number of overlapping blade members is low, a small gap Ga is adequate, but the gap between the resin plate 15 and the driving ring 31 is set by the maximum number of overlapping blades.

Figure 15A:
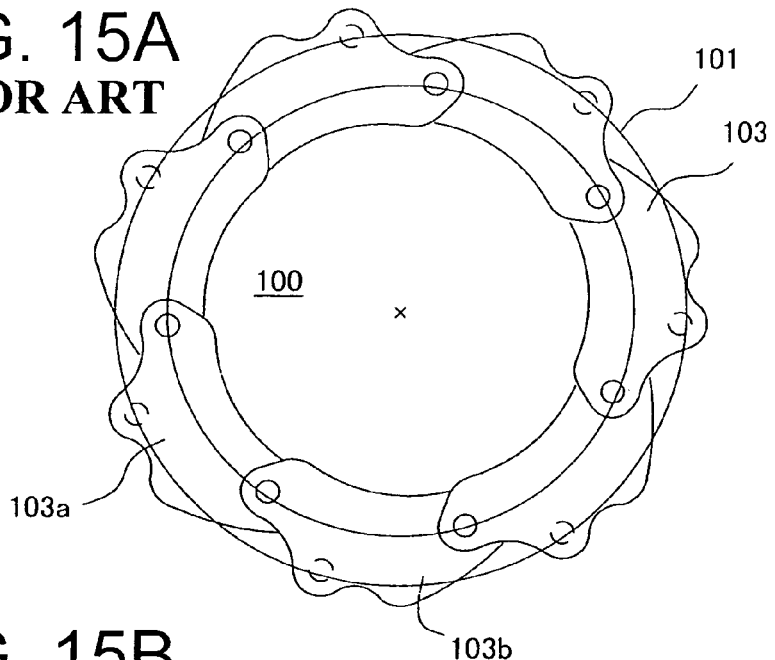
FIG. 15A is an explanatory view of a planar configuration when blade members are made a full aperture state.
Figure 15B:
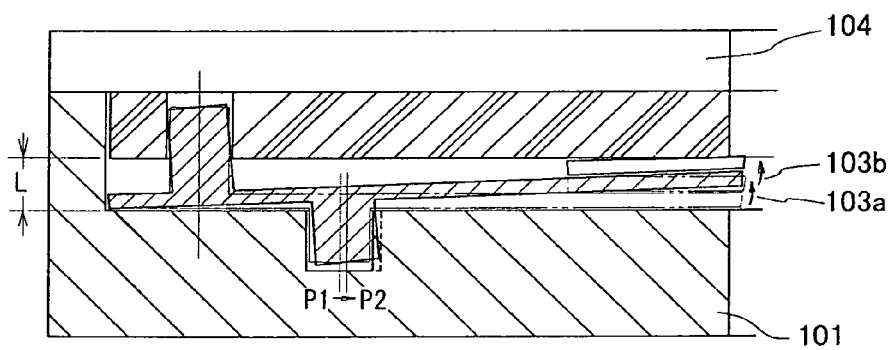
FIG. 15B is the cross-sectional view.
Figure 15C:
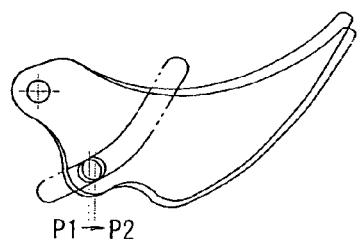
FIG. 15C is a state view showing an open/close state due to the inclination of the blade member.
Figure 16:
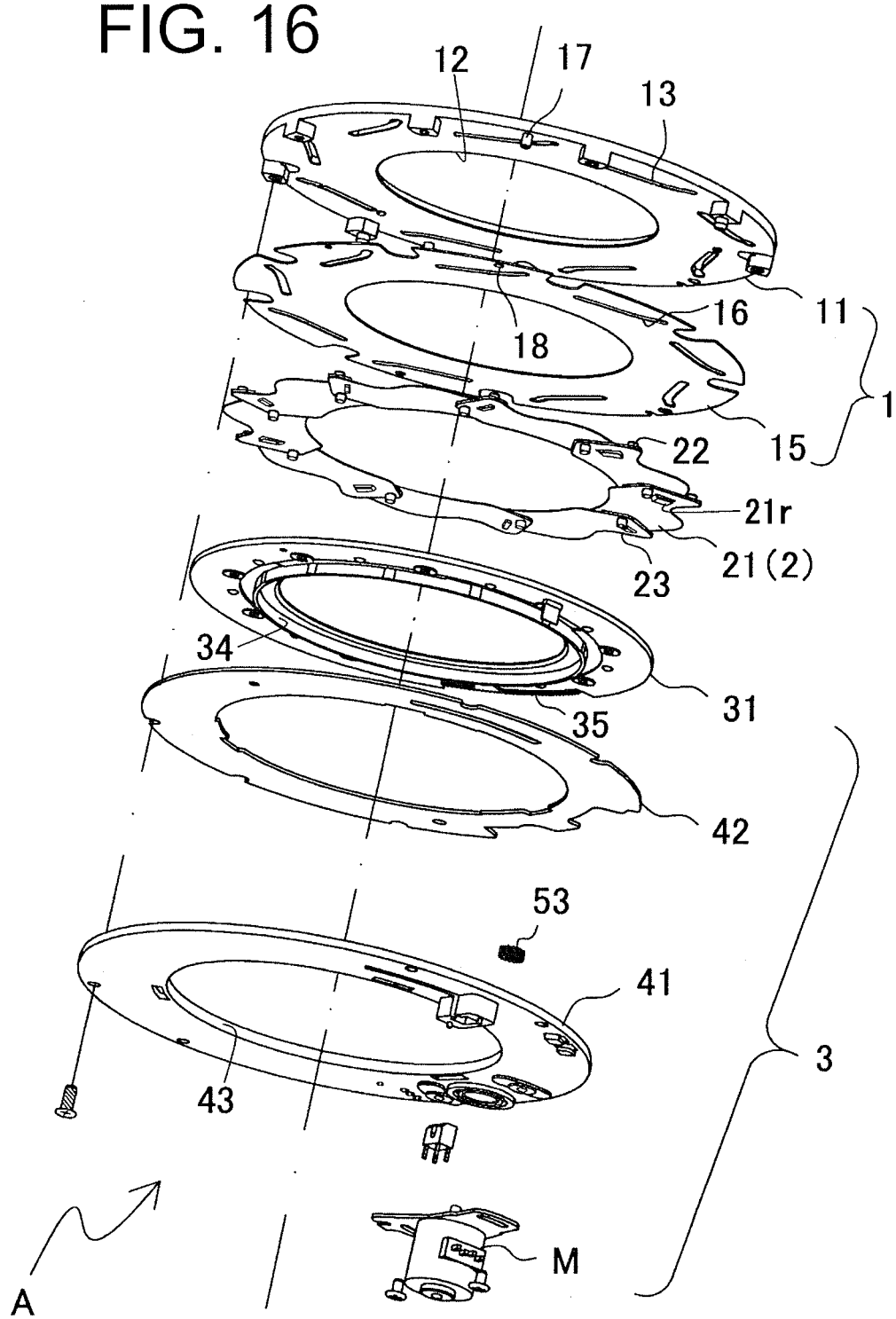
FIG. 16 is an explanatory view of a perspective configuration showing an Embodiment (Embodiment 3) different from FIG. 1.
Figure 17:
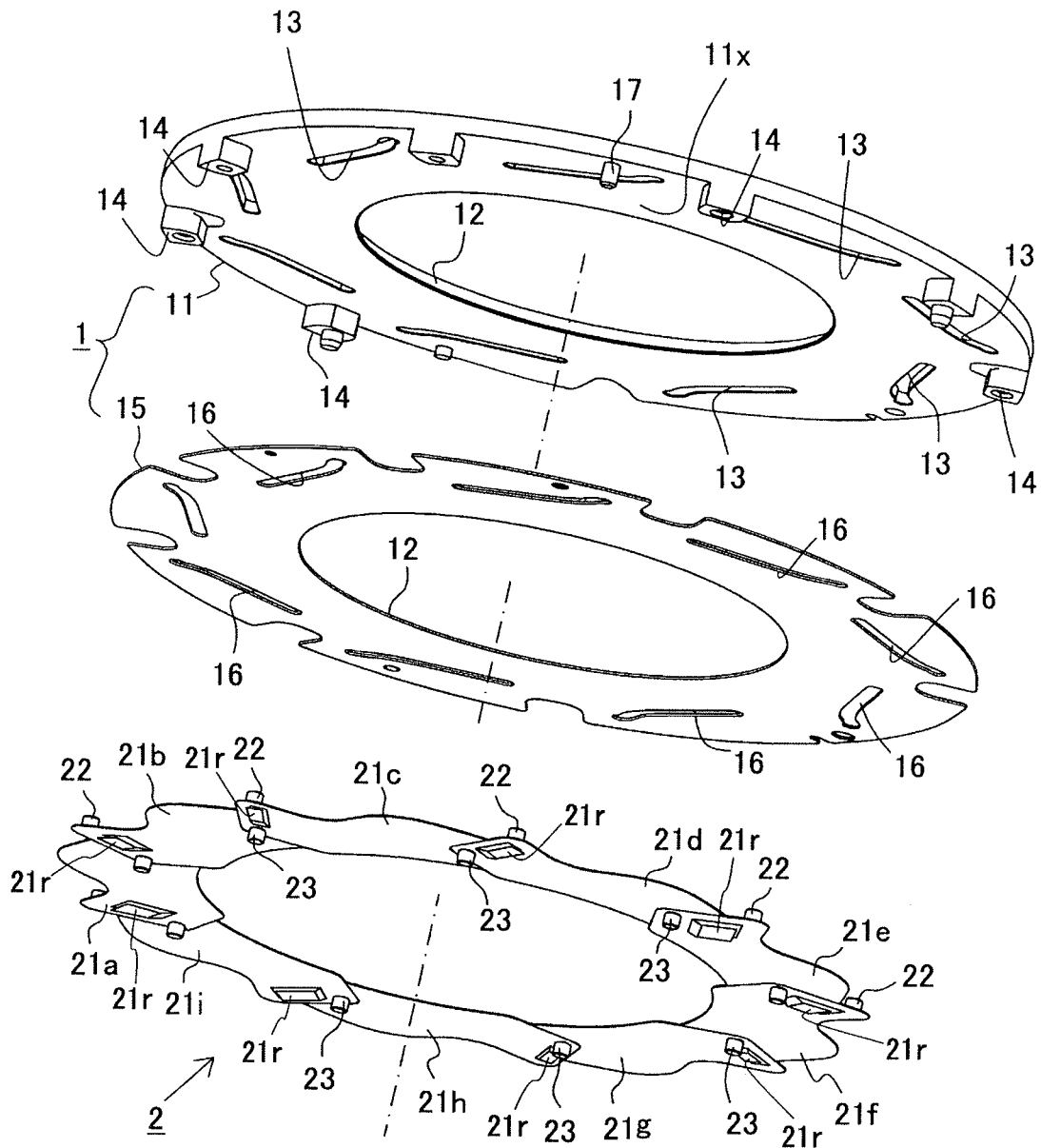
FIG. 17 is an enlarged configuration explanatory view of a first board (base plate) and a blade set in the apparatus of FIG. 16.
Figure 18:
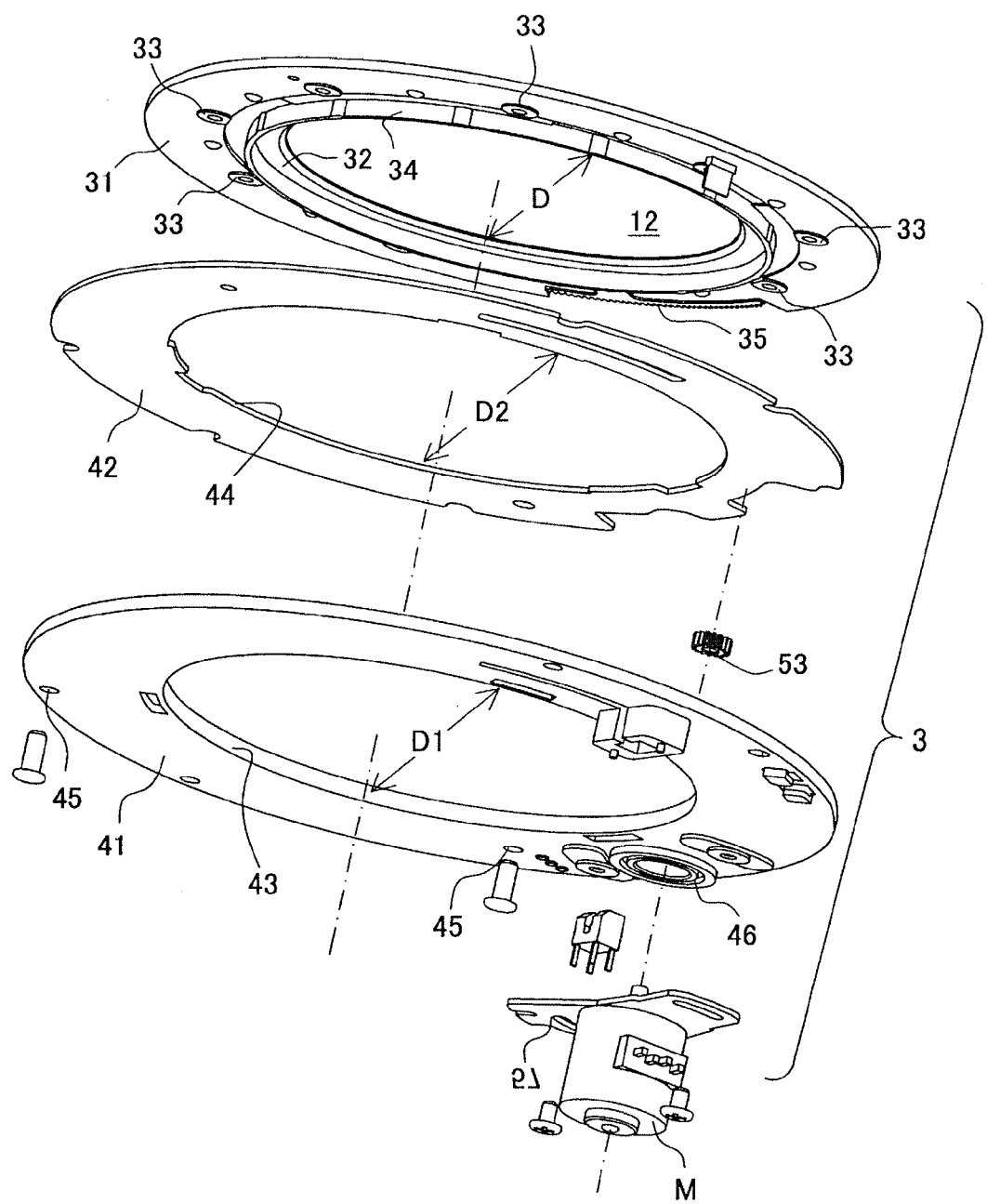
FIG. 18 is an enlarged configuration explanatory view of a second board (driving ring) in the apparatus of FIG. 16.
Figure 19A:
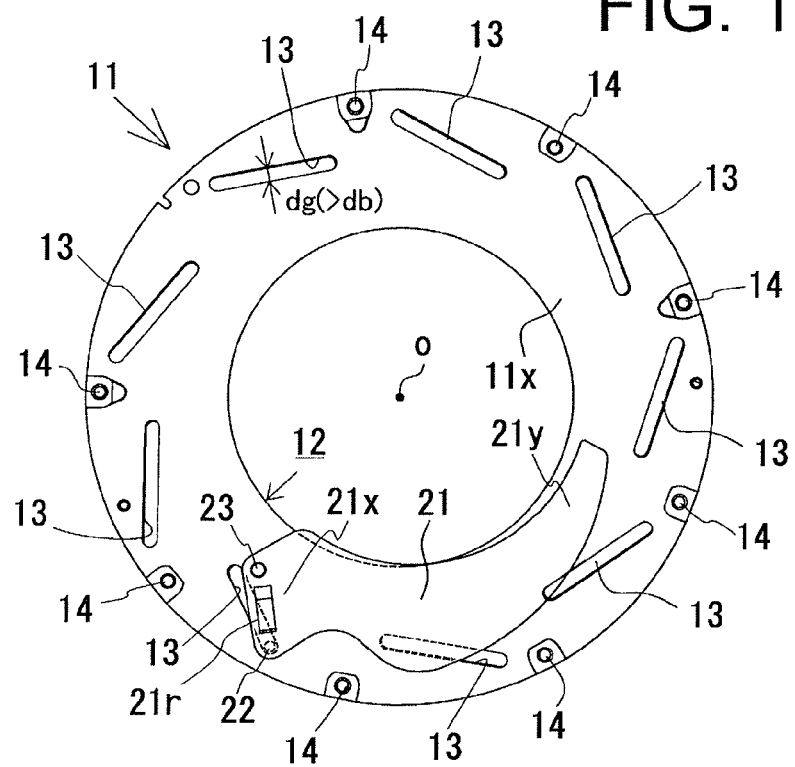
FIG. 19A is an explanatory view showing a shape of the first board (base plate) in the apparatus of FIG. 16.
Figure 19B:
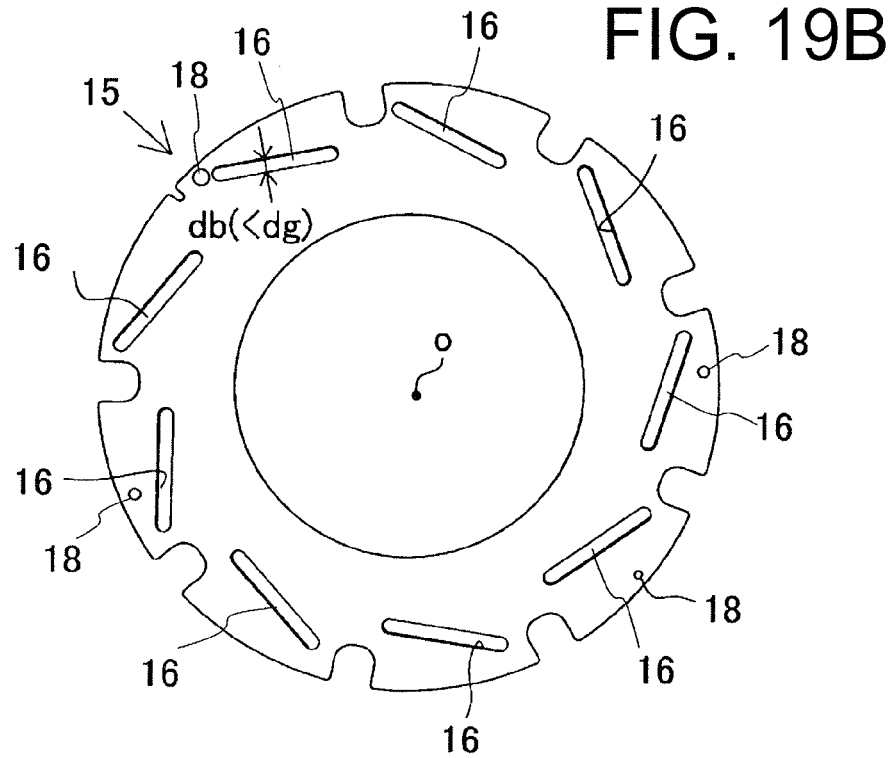
FIG. 19B is an explanatory view showing a state of a resin plate.
Figure 20A:
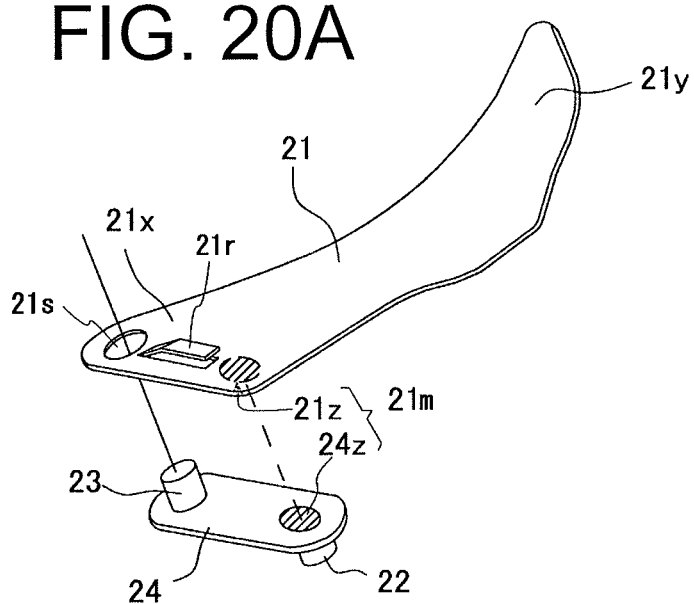
FIG. 20A is an explanatory view of an exploded state of the blade member.
Figure 20B:
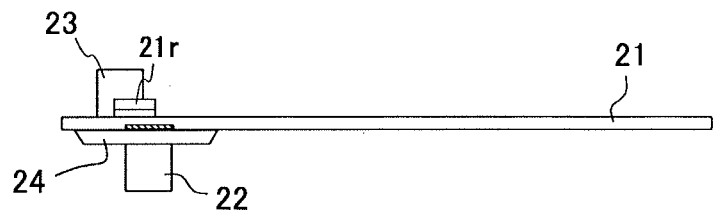
FIG. 20B is an explanatory view of a cross-sectional configuration of the blade member.
Figure 20C:
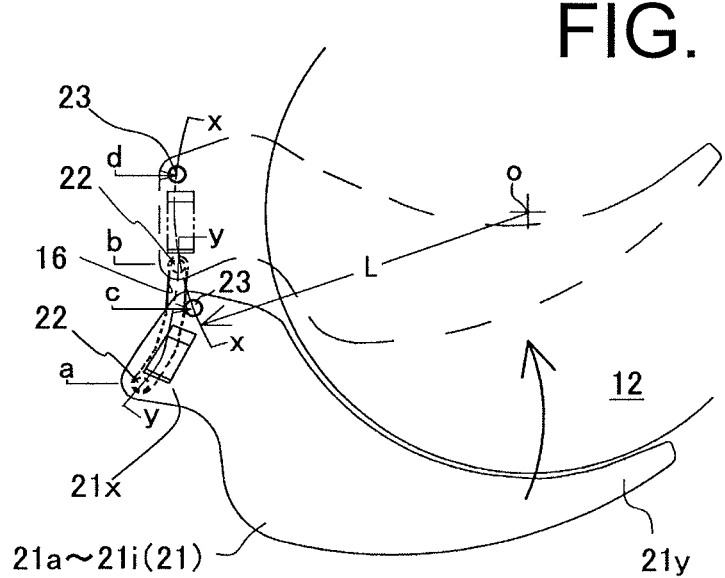
FIG. 20C is an explanatory view of an open/close trajectory of the blade member.

As a result, in the full aperture state of the blade members as shown in FIG. 15, or in a state near the full aperture state, since a large gap is formed relative to the number of overlapping blade members, the blade member 103a tends to incline. This state is shown in FIG. 15B. In contrast thereto, as shown in FIG. 7B, since the resin plate 15 existing between the blade members 21 and the base plate 11 presses the blade members against the driving ring 31 side as shown in the figure, the inclination of the blade member 21a is suppressed.

Further, in the small aperture state of the blade members as shown in FIG. 8A or in an aperture state near the small aperture state, the front end portion 21y of the blade member 21 is warped by overlapping with the front end portion 21y of another blade member 21, the base end portion 21x tends to incline due to the warp of the front end portion 21y, the resin plate 15 presses the blade member against the driving ring 31 side as shown in the figure, and thus suppresses the inclination, and the blade members 21 do not incline.

In addition, the case is described where the step portions 11z are formed in the blade support surface 11x of the base plate 11 to provide the resin plate 15 with the elastic force, and it is possible to eliminate the steps of the support surface by providing the resin plate 15 with cut raised elastic pieces.

Embodiment 2 of the Elastic Member

The case is shown where the elastic member as described above is disposed between the base plate and the blade members to press the blade members varying in the number of overlapping blades against the driving ring side, and is provided with the elastic force by the step portions 11z provided in the base plate. As a substitute for this Embodiment, it is also possible to adopt the following Embodiment. The same configuration as in the Embodiment shown in FIGS. 2 and 3 is assigned the same reference numeral to omit the description thereof.

Figure 10:
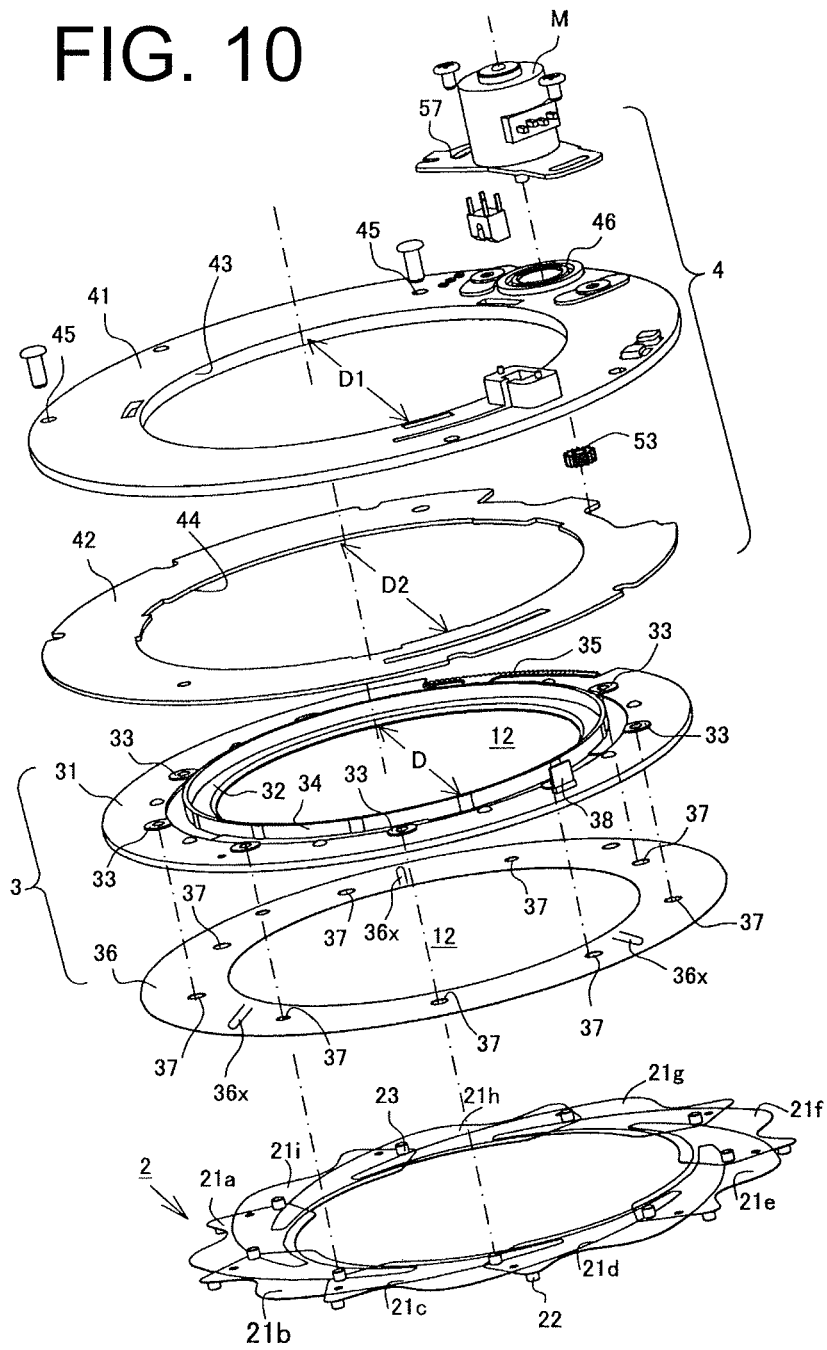
FIG. 10 is an explanatory view of a perspective configuration showing an Embodiment (Embodiment 2) different from FIG. 1.

As shown in FIG. 10, the base plate 11, blade members 21, driving ring 31, and hold-down plate 41 are assembled in this order in a laminated form. At this point, a resin plate 36 is disposed between the blade members 21 and the driving ring 31. For example, the resin plate 36 is configured as described below.

[Configuration of the Elastic Member]

Figure 11A:
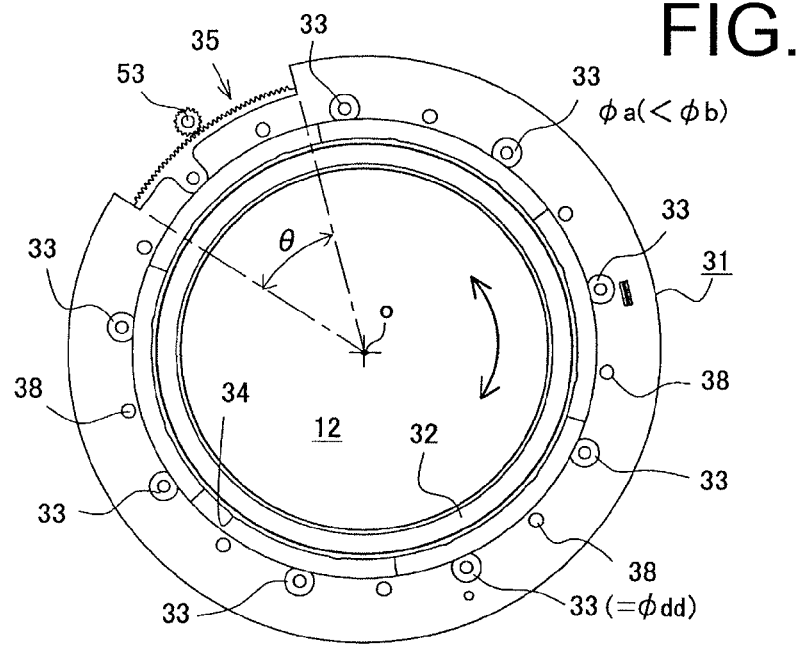
FIG. 11A is an explanatory view of the driving ring.
Figure 11B:
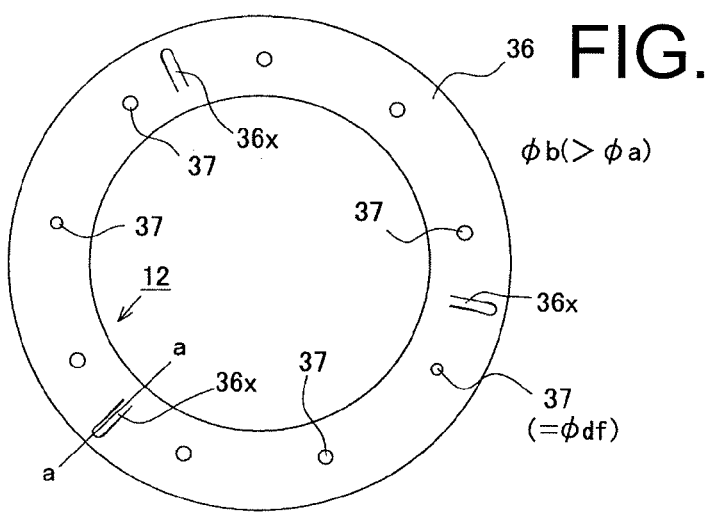
FIG. 11B is an explanatory view of the elastic member.
Figure 11C:
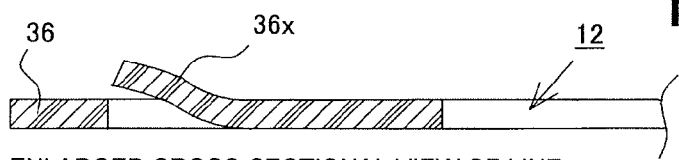
FIG. 11C is an explanatory view of the cross section of the elastic member.
Figure 12A:
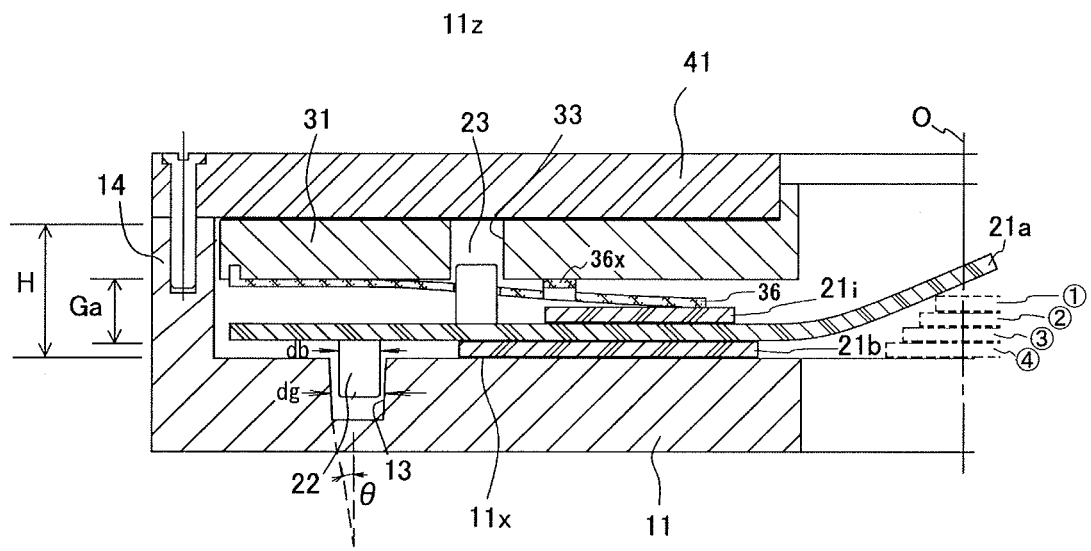
FIG. 12A is an explanatory view of an overlapping state when blade members are reduced to a small aperture state.
Figure 12B:
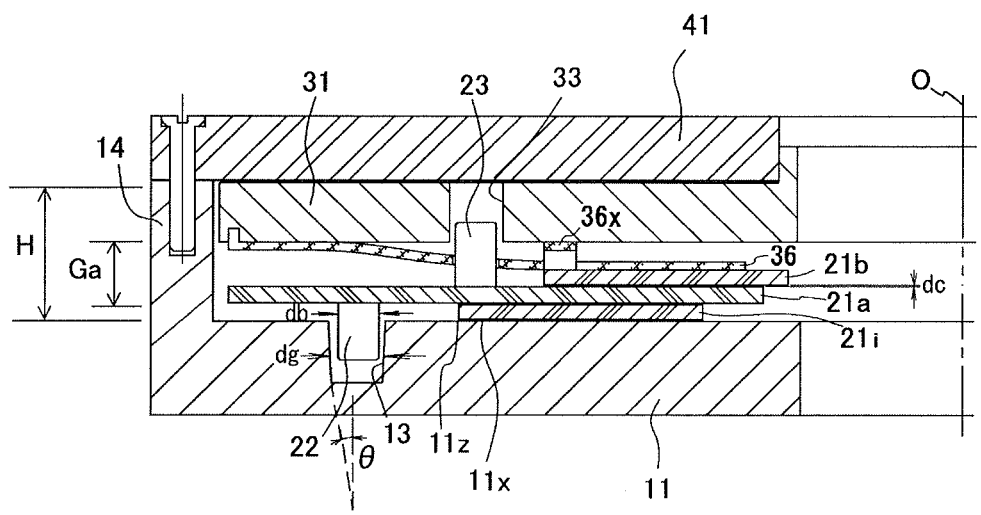
FIG. 12B is an explanatory view of an overlapping state when blade members are made a full aperture state.

The resin plate 36 is formed of a resin film (e.g. resin film made of polyethylene or the like) having the optical-axis aperture 12 at the center as shown in FIG. 11B, and is provided in between the driving ring 31 and the blade members 21.

This is because of preventing the blade members 21 from directly coming into contact with the driving ring 31, and obtaining smooth open/close motion of the blade members. Concurrently, the resin plate 36 is provided with cut raised elastic pieces 36x, and due to the action of the elastic pieces, presses the blade members 21 against the opposed base plate 11 side.

In addition, the resin plate 36 shown in the figure is made of the same material as the blade members 21. This is because by thus using the same material in the blade members and the slide ring that mutually slide, temperature characteristics such as a thermal change are substantially the same as the blade members, the blade members and resin plate are of the same material and have the same electrification rank, and therefore, static electricity is not charged when both of the member and the plate slide.

The resin plate 36 is formed in the shape of a ring similar to the driving ring 31. In the resin plate 36, engagement holes 37 are provided in positions coincident with the fit holes 33 of the driving ring 31.

In the fit hole 33 of the driving ring 31 and the engagement hole 37 of the resin plate 36, the relationship between the outside diameter de of the second protrusion (operating pin) 23 formed in each blade member, the diameter dd of the fit hole 33 of the driving ring 31, and the diameter df of the engagement hole 37 of the resin plate 36 is set as the following equation.

$$de \leq dd \square df \quad \text{(Eq. 1)}$$

In other words, the outside diameter de of the operating pin (second protrusion) 23 of the blade member and the diameter dd of the fit hole 33 of the driving ring 31 are fitted to be mutually adapted, and the diameter df of the engagement hole 37 of the resin plate 36 is set to be sufficiently larger than the outside diameter de of the operating pin (second protrusion) 23.

By this means, the operating pin (second protrusion) 23 of the blade member is substantially fitted into the fit hole 33 of the driving ring 31, and does not engage in the engagement hole 37 of the resin plate 36.

Described below is the reason that the fit hole 33 (diameter dd) of the driving ring 31 is thus set at a diameter smaller than the engagement hole 37 (diameter df) of the resin plate 36. The resin plate 36 exists between the driving ring 31 and the blade members 21. Therefore, the resin plate 36 also performs rotation motion by open/close motion of the blade members 21 or rotation motion of the driving ring 31.

Further, the cut raised elastic pieces 36x are formed in portions (for example, three portions at 120-degree intervals) as appropriate in the resin plate 36. The elastic pieces 36x are formed of curved bent pieces to contact the driving ring on the opposite side from the surface in contact with the blade members of the elastic member.

Accordingly, the cut raised elastic pieces 36x come into contact with the driving ring 31, and the resin plate 36 thereby presses the blade members 21 against the base plate side. The action is the same as the action described according to FIGS. 7 and 8.

[Image Pickup Apparatus]

Figure 13:
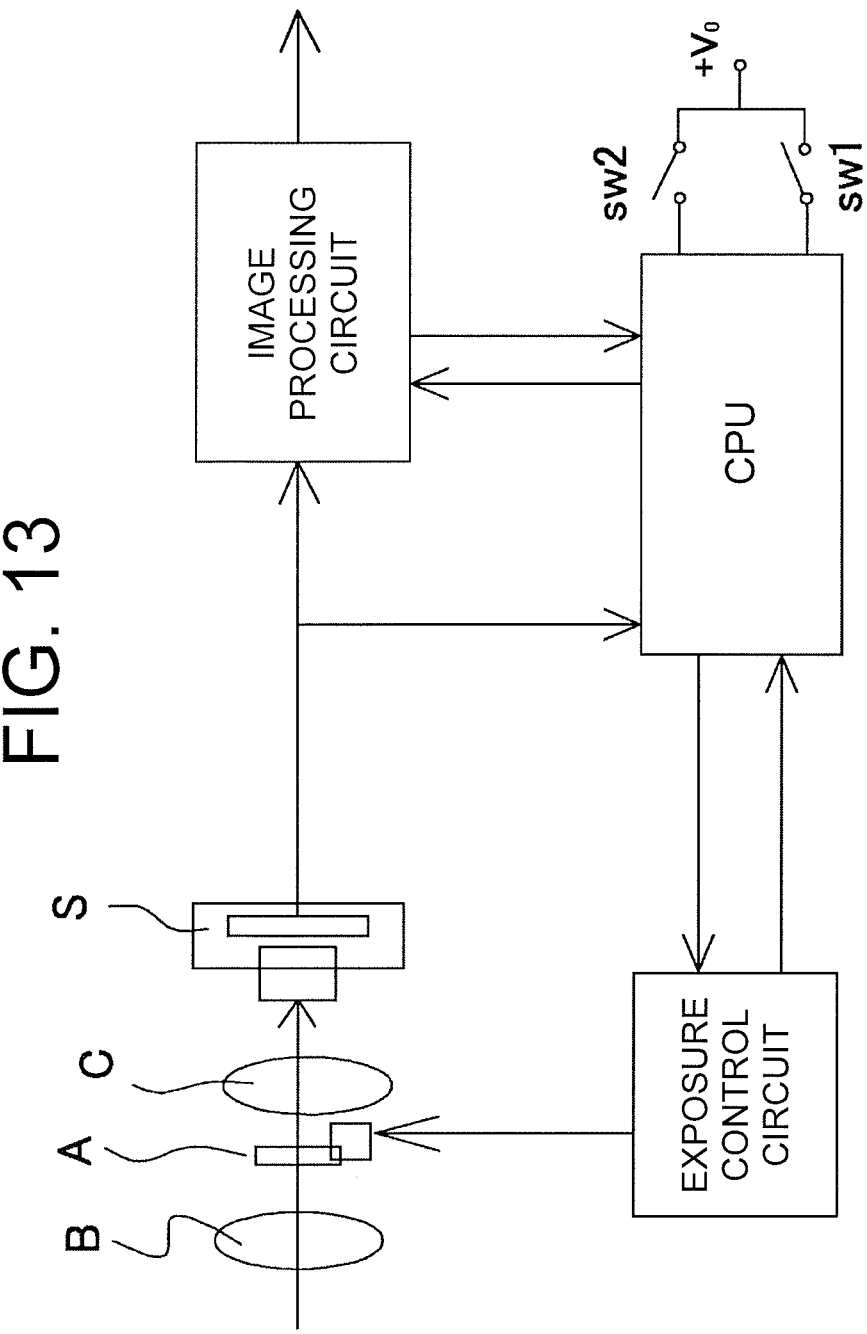
FIG. 13 is an explanatory view showing a configuration of an image pickup apparatus according to the invention.
Figure 14A:
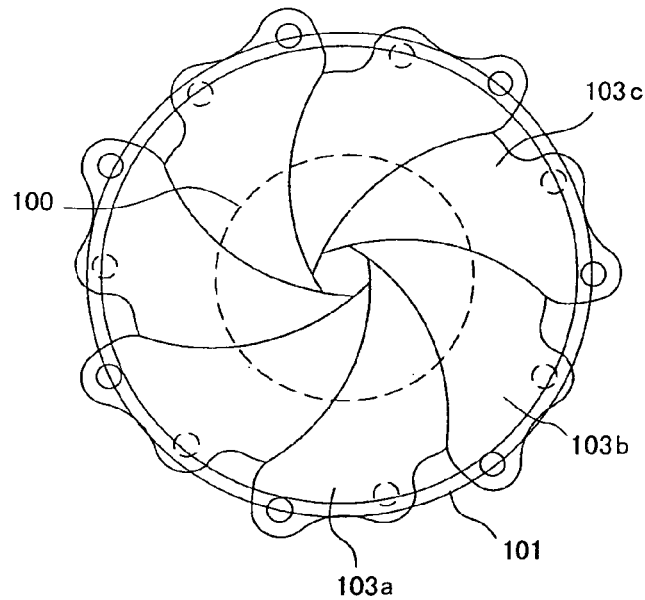
FIG. 14A is an explanatory view of a planar configuration when blade members are reduced to a small aperture state.
Figure 14B:
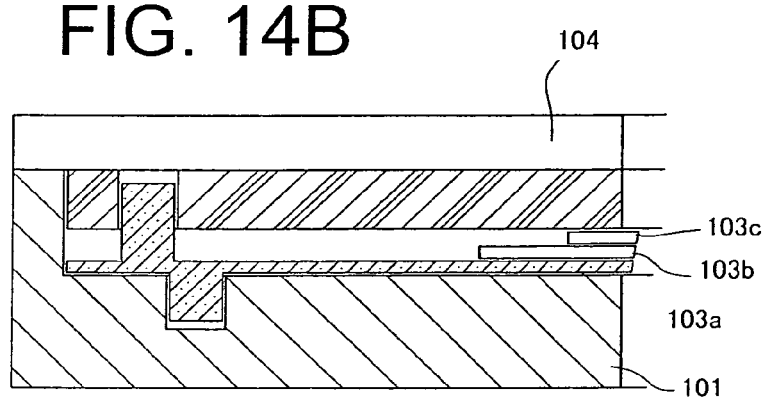
FIG. 14B is the cross-sectional view.

An image pickup apparatus using the above-mentioned light quantity adjustment apparatus A will be described next based on FIG. 13. The above-mentioned light quantity adjustment apparatus is incorporated into a lens barrel of a still camera, video camera, etc. "B" shown in the figure denotes a front lens disposed in the shooting light path, "C" denotes a back lens, an image of a subject image is formed by the lenses, and an image pickup means S is disposed in the image formation surface. As the image pickup means S, a solid-state image sensing device such as a CCD, a photosensitive film or the like is used.

Then, it is configured that control is executed by a CPU control circuit and exposure control circuit. "SW1" shown in the figure denotes a main power supply switch, and "SW2" denotes a shutter release switch. As control as a camera apparatus, as well as the circuits, an autofocus circuit or the like is used, the configuration is well known, and therefore, the description is omitted.

Then, a diaphragm apparatus E and shutter apparatus (not shown) are installed in between the front lens B and back lens C incorporated into the lens barrel. Into the diaphragm apparatus E are incorporated the blade members 21 as described previously and the driving unit M.

Then, the control CPU sets shooting conditions such as an exposure amount and shutter speed, and issues direction signals to the exposure control circuit. First, as the exposure amount, the exposure control circuit supplies a current in the predetermined direction to the coil of the driving apparatus M by a direction signal from the control CPU. Then, the rotation of the driving apparatus M is conveyed to the blade members 21 from the operating pins 23 via the driving gear 53, and the blade members 21 stop the optical-axis aperture 12 to an optimal exposure amount.

Next, when a release button is operated, in the case of the solid-state image sensing device such as a CCD, the already charged charge is released, and shooting is started. Then, after a lapse of exposure time beforehand set by the control CPU, a shutter driving circuit receives a signal for starting shutter action, and supplies a current in the shutter close direction to the coil of the driving apparatus. After the shutter action, in the case that the image pickup means S is the CCD (solid-state image sensing device), image data is transferred to an image processing circuit and stored in a memory or the like.

Embodiments 3 and 4 of the Elastic Member

The above-mentioned Embodiments 1 and 2 show the case where the resin plate 15 is the elastic member, the step portions 11z or cut raised elastic pieces 36x are provided, and the resin plate 15 is thereby provided with the elastic force, and presses the blade members 21 against the driving rind 31 side or the base plate 11 side. As a substitute for the Embodiments, it is also possible to adopt the following Embodiments. The same configuration as in above-mentioned Embodiments 1 and 2 is assigned the same reference numeral to omit the description thereof.

FIGS. 16 to 22 are views showing the light quantity adjustment apparatus A provided with the elastic member of Embodiment 3. In Embodiment 3, the elastic member is formed in the blade member 21. The blade member 21 is formed by die-cutting forming, and in the die-cutting forming, a cut piece (elastic member) 21r formed in the shape of a step by cutting a part of the base end portion 21x is formed in the base end portion 21x (see FIGS. 20A and 20B).

The cut piece 21r has the elastic force because each blade member 21 is made of, for example, a polyethylene film (PET film).

Figure 21A:
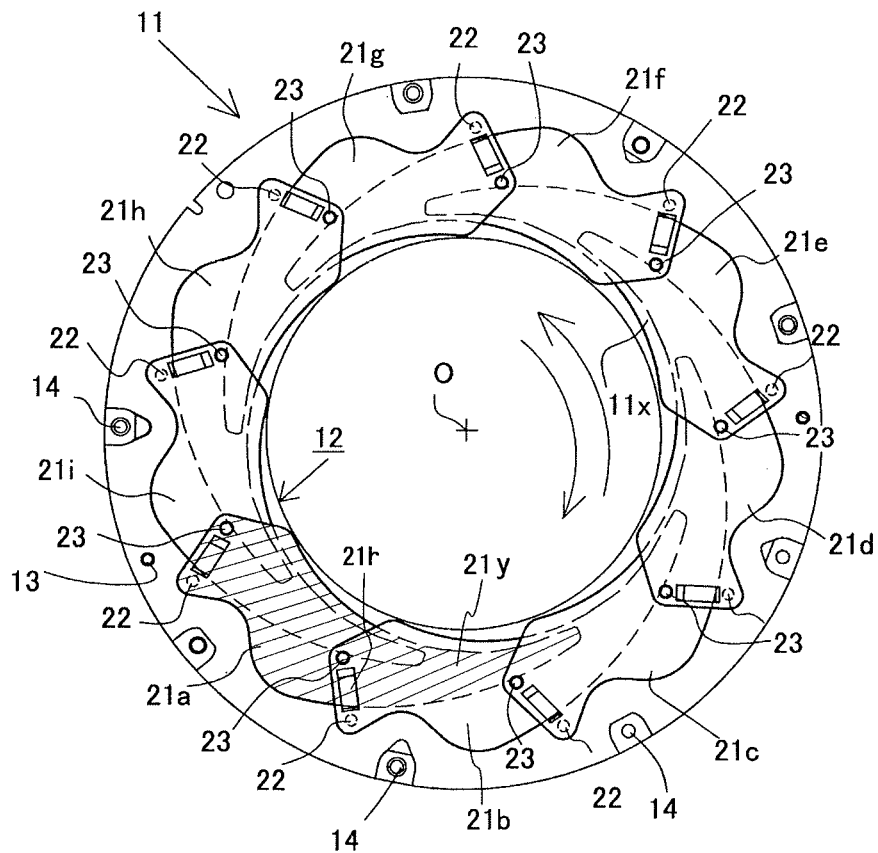
FIG. 21A is an explanatory view of an overlapping state when blade members are in a full aperture state (full aperture diameter)
Figure 21B:
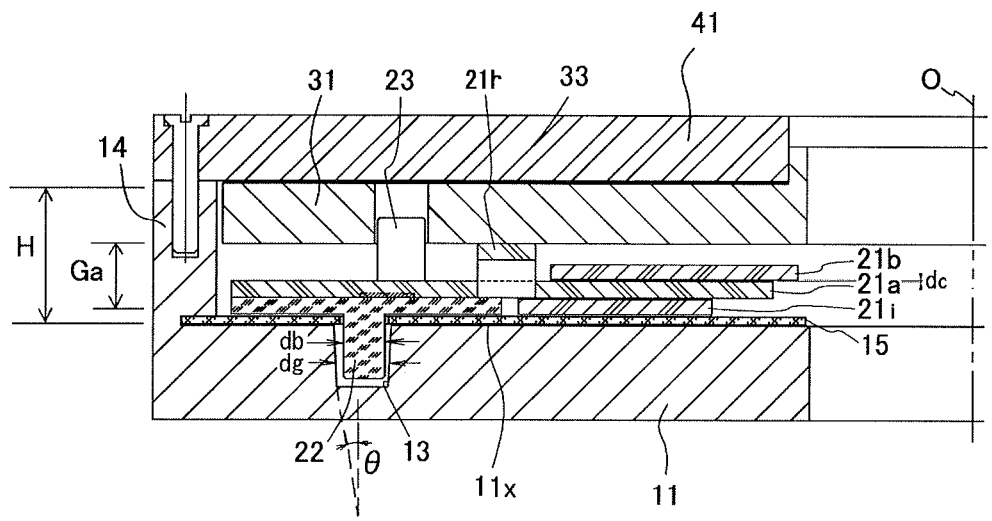
FIG. 21B is an explanatory view of the section state.

Then, as shown in FIG. 21B, the cut piece 21r comes into contact with the plane of the driving ring 31, and causes elastic deformation, and the reaction force biases the base end portion 21x to the base plate 11 side via the resin plate 15 as the elastic force.

By this biasing, the base end portion 21x of each blade member 21 is kept in the attitude state parallel to the surface 11x of the base plate 11 (resin plate 15), and does not incline, and therefore, fluctuations in the light quantity do not occur.

In addition, the cut piece 21r may be a protrusion plane (for example, an upper plane of the protrusion portion with the cut portion of the cut piece 21r coupled) which is the shape of the easiest in processing, and for example, is formed by a height difference in the base end portion of the blade member to obtain the elastic force as the elastic member.

Further, the cut piece 21r is arranged in between the first pin-shaped protrusion (guide pin) 22 and the second pin-shaped protrusion (operating pin) 23, the elastic force is thereby applied uniformly to each shaft, and the inclination suppression effect on each blade member is enhanced.

In addition, as this cut piece 21r, it is also possible to configure the piece using a different member from each blade member 21, and provide the member in the base end portion 21x of each blade member 21 by adhesion or welding.

Figure 23:
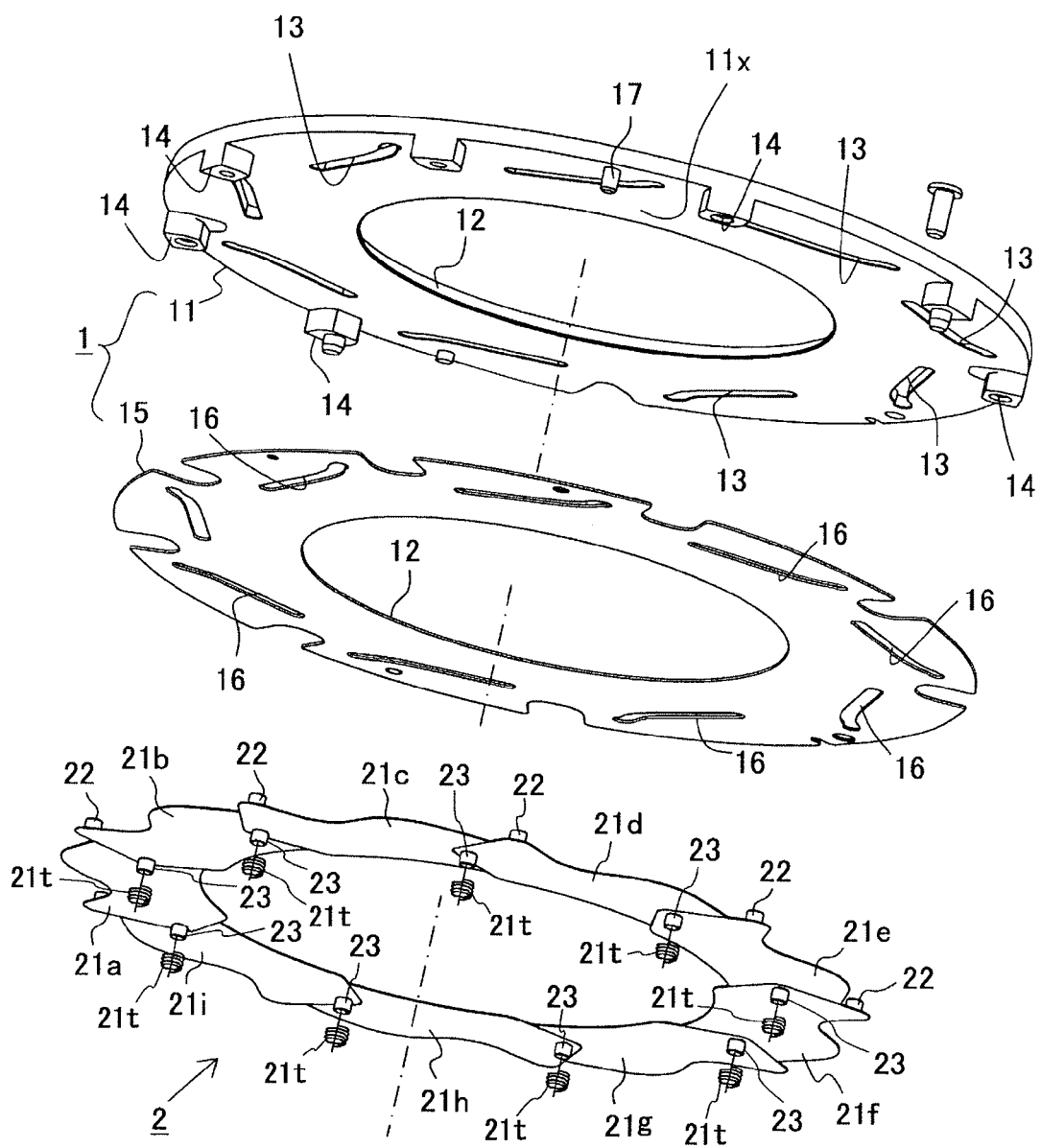
FIG. 23 is an explanatory view of a perspective configuration showing a different Embodiment corresponding to FIG. 17.
Figure 24A:
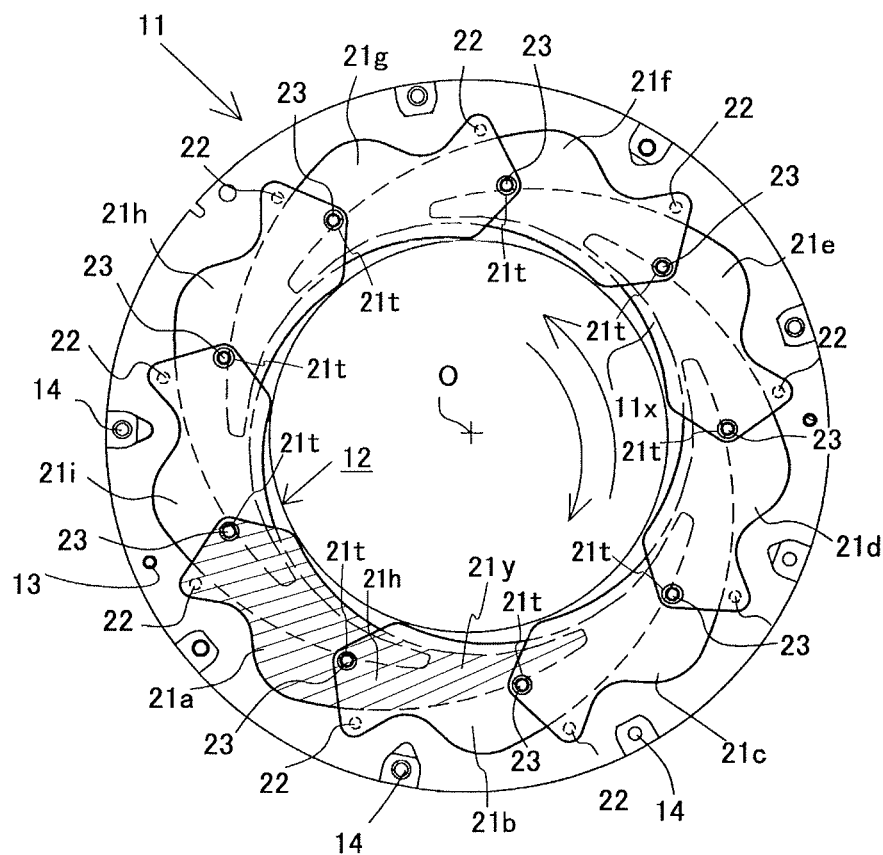
FIG. 24A is an explanatory view of an overlapping state when blade members are in a full aperture state (full aperture diameter)
Figure 24B:
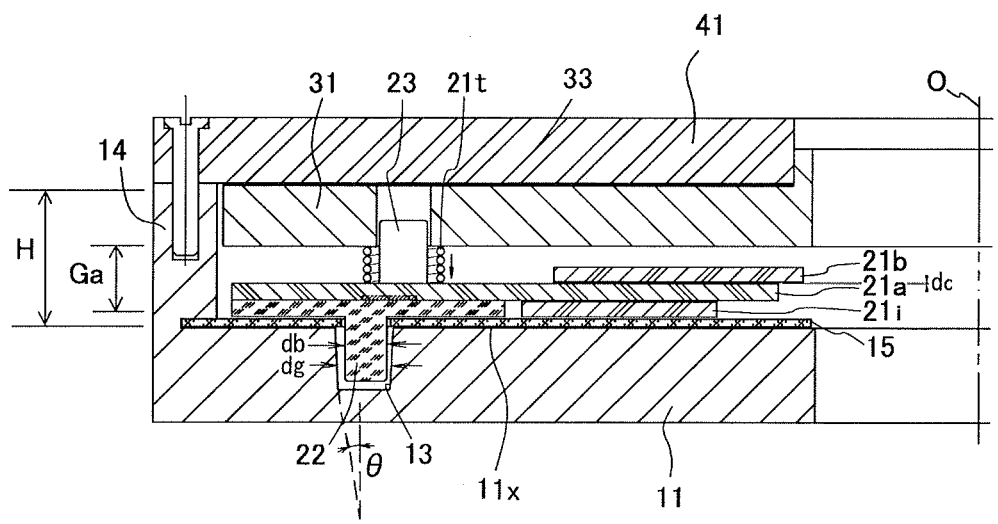
FIG. 24B is an explanatory view of the section state.
Figure 25A:
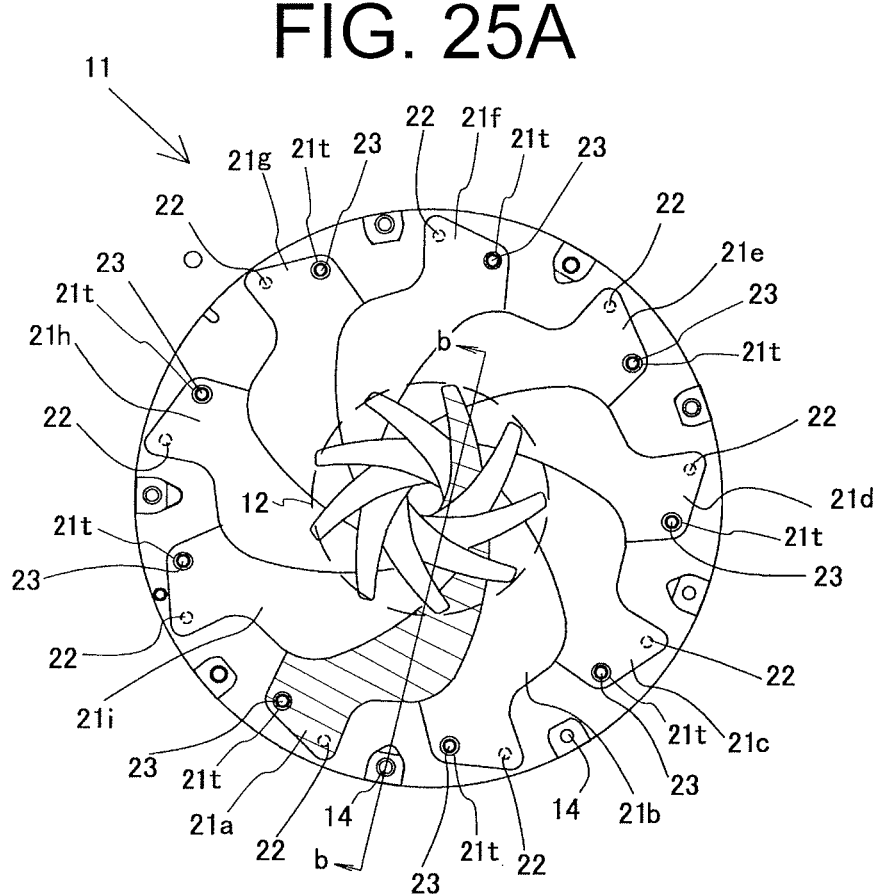
FIG. 25A is an explanatory view of an overlapping state when blade members are in a small aperture state (minimum aperture diameter)

FIGS. 23 to 25 are views showing the light quantity adjustment apparatus A provided with the elastic member of Embodiment 4. In this Embodiment, as a substitute for the above-mentioned cut piece 21r, using a spring member 21t (elastic member) which is wound around the second pin-shaped protrusion (operating pin) 23 of each blade member 21 and is compressed and arranged in between the base end portion and the driving ring 31 in which the second pin-shaped protrusion 23 engages, due to biasing of the spring member 21t, the base end portion 21x of each blade member 21 may be kept in the attitude state parallel to the surface 11x of the base plate 11 (resin plate 15) (elastic member of Embodiment 4).

Further, also when the spring member 21t is arranged on the first pin-shaped protrusion (guide pin) 22 side, it is possible to obtain the same effect.

Then, by providing the elastic member of the cut piece 21r and spring member 21t using a different member from each blade member 21, it is possible to set an appropriate elastic force irrespective of the material of the blade member, the inclination suppression effect on each blade member is obtained under correct conditions, and it is possible to ensure smooth operation.

Moreover, by using the shaft of the second pin-shaped protrusion (operating pin) 23 or the first pin-shaped protrusion 22 due to the spring member 21, it is also possible to resolve the risk of interfering with open/close motion of adjacent blade members.

Figure 22A:
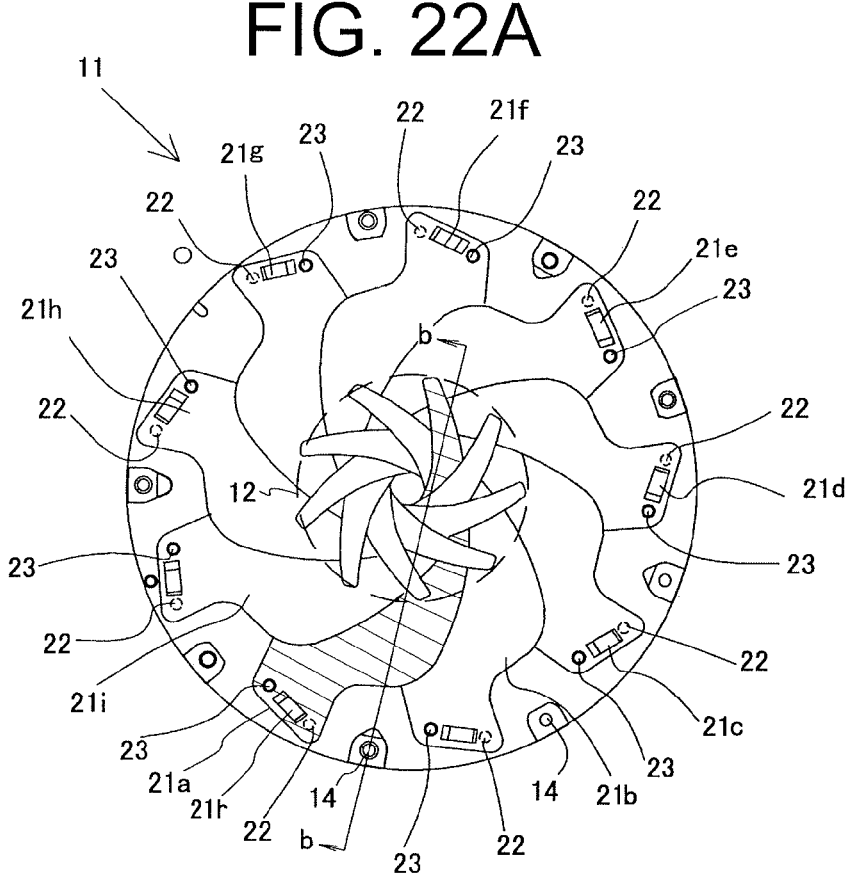
FIG. 22A is an explanatory view of an overlapping state when blade members are in a small aperture state (minimum aperture diameter)
Figure 22B:
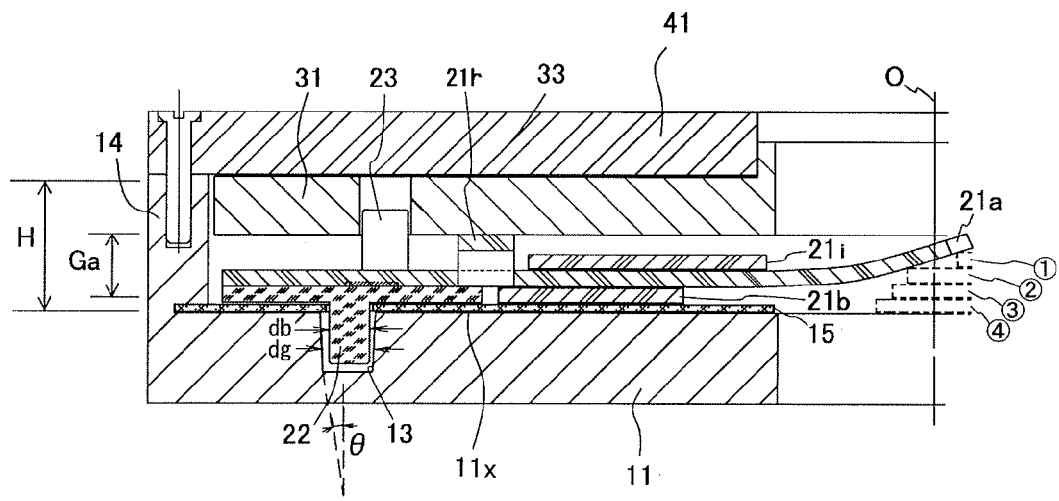
FIG. 22B is an explanatory view of the section state.

FIGS. 21 and 22 are views showing the action state of the configuration provided with the cut piece 21r. In addition, the same configuration as in the Embodiment shown in FIGS. 7 and 8 is assigned the same reference numeral to omit the description thereof. FIG. 21 shows the apparatus in the full aperture state, and FIG. 22 shows the apparatus in the small aperture state, and as shown in FIG. 21B, the step surface of the cut piece 21r formed in the base end portion 21x of the blade member 21a comes into press-contact with the plane of the driving ring 31, and causes elastic deformation.

By undergoing the reaction due to the deformation of the cut piece 21r, the base end portion 21x of the blade member 21a is pressed against the surface 11x of the base plate 11 via the resin plate 15, and as a result, the inclination of the blade member 21a is suppressed.

Further, in the small aperture state of the blade members as shown in FIG. 22A or in an aperture state near the small aperture state, the front end portion 21y of the blade member 21 is warped by overlapping with the front end portion 21y of another blade member 21, the base end portion 21x tends to incline due to the warp of the front end portion 21y, the step surface of the cut piece 21r formed in the base end portion 21x of the blade member 21a comes into press-contact with the plane of the driving ring 31 and causes elastic deformation, the base end portion 21x of the blade member 21a undergoes the reaction due to the deformation of the cut piece 21r and is pressed against the surface 11x of the base plate 11 via the elastic member 15, and the inclination of the blade member 21a is thereby suppressed.

Figure 25B:
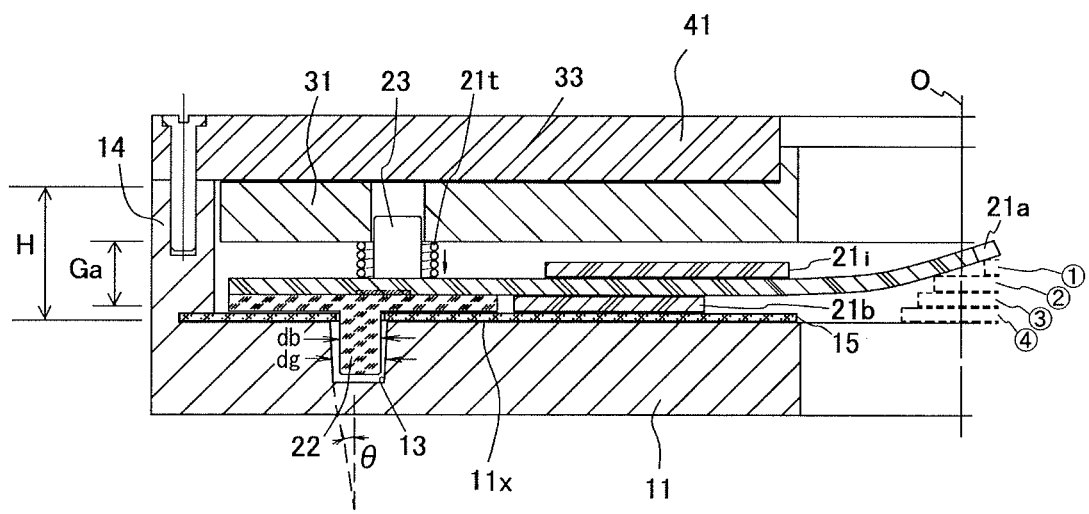
FIG. 25B is an explanatory view of the section state.

FIGS. 23 to 25 show the configuration in which the spring plate 21t is arranged in each operating pin (second protrusion) 23 arranged on the driving ring 31 side of each blade member 21. As shown in FIGS. 24B and 25B, the spring member 21t is incorporated in a compressed state in between the base end portion and the driving ring 31 that the operating pin 23 engages, always presses the base end portion 21x of the blade member 21a against the surface 11x of the base plate 11 via the resin plate 15, and suppresses the inclination of the blade member 21a.

The effects of the light quantity adjustment apparatuses shown in Embodiments 3 and 4 will be described below. For a plurality of blade members (21) overlapping one another, a large gap relative to the overlapping thickness of the blade members is formed in between the board (11) and the driving ring (31) for supporting the blade members to be openable and closable, each blade member is in the gap between the board and the driving ring, the inclination of each blade member is suppressed by the elastic member (21r or 21t), for example, when each blade member is warped up from the base end portion (21x) toward the front end portion (21y) and thus tends to incline in a small aperture state, or when each blade member tends to incline due to a change in the attitude of the image pickup apparatus in a full aperture state, and the base end portion of each blade member to open and close does not incline significantly. Accordingly, misalignment due to the inclination does not occur in the engagement position between the pin-shaped protrusion and the groove holes (33) formed in a pair of shafts (22, 23) of each blade member, and the board and driving ring, and it is thereby possible to set an aperture diameter by each blade member at a correct value and to make correct light quantity adjustments.

Further, since each of a plurality of blade members is comprised of an elastically deformable blade substrate forming the base end portion and the blade portion, and the elastic means is formed of a protrusion surface having the elastic force formed by a height difference in the base end portion of the blade substrate, without increasing the number of apparatus components, further without increasing the number of assembly processes, only by assembling each blade member in a normal assembly process, the elastic force of each blade member itself enables the base end portion of each blade member to be biased to the position on the board side or the driving ring side.

Furthermore, since each of a plurality of blade members is comprised of an elastically deformable blade substrate forming the base end portion and the blade portion, and the elastic means is formed of a cut piece (21r) formed in the shape of a step by cutting a part of the base end portion of the blade substrate, without increasing the number of apparatus components, further without increasing the number of assembly processes, only by assembling each blade member in a normal assembly process, the elastic force of each blade member itself enables the base end portion of each blade member to be biased to the position on the board side or the driving ring side.

Still furthermore, since each of a plurality of blade members is comprised of an elastically deformable blade substrate forming the base end portion and the blade portion and an auxiliary substrate provided with a joint surface to be joined to the base end portion in which are formed a pair of shafts comprised of a first shaft penetrating the base end portion from the joint surface and a second shaft provided to stand on the opposite side to the joint surface, and the elastic means is formed of a cut piece formed in the shape of a step by cutting a part of the base end portion of the blade member facing the auxiliary substrate, without increasing the number of apparatus components, further without increasing the number of assembly processes, only by assembling each blade member in a normal assembly process, the elastic force of each blade member itself enables the base end portion of each blade member to be biased to the position on the board side or the driving ring side.

Moreover, since each blade member has at the base end portion a pair of shafts supported by adhesion or welding or integrally formed, and the elastic means is formed of a cut piece formed in the shape of a step by cutting a part of the base end portion of the blade member in between the pair of shafts, without increasing the number of apparatus components, further without increasing the number of assembly processes, only by assembling each blade member in a normal assembly process, the elastic force of each blade member itself enables the base end portion of each blade member to be biased to the position on the board side or the driving ring side. Further, the elastic means is arranged in between a pair of shafts, the elastic force due to the elastic means is thereby applied to each shaft uniformly, and the inclination suppression effect on each blade member is enhanced.

Further, since the elastic means is comprised of a spring member which is wound around one of a pair of shafts of each blade member and is compressed and arranged in between the base end portion and the board or the driving ring in which the shaft engages, it is possible to bias each blade member to the position on the board side or the driving ring side using the shaft of each blade member as the center. Furthermore, by using the spring member as the elastic member, it is possible to set an appropriate elastic force irrespective of the material of the blade member, the inclination suppression effect on each blade member is obtained under correct conditions, and it is possible to ensure smooth operation. Still furthermore, by using the shaft, it is also possible to resolve the risk of interfering with open/close motion of adjacent blade members.

Figure 26:
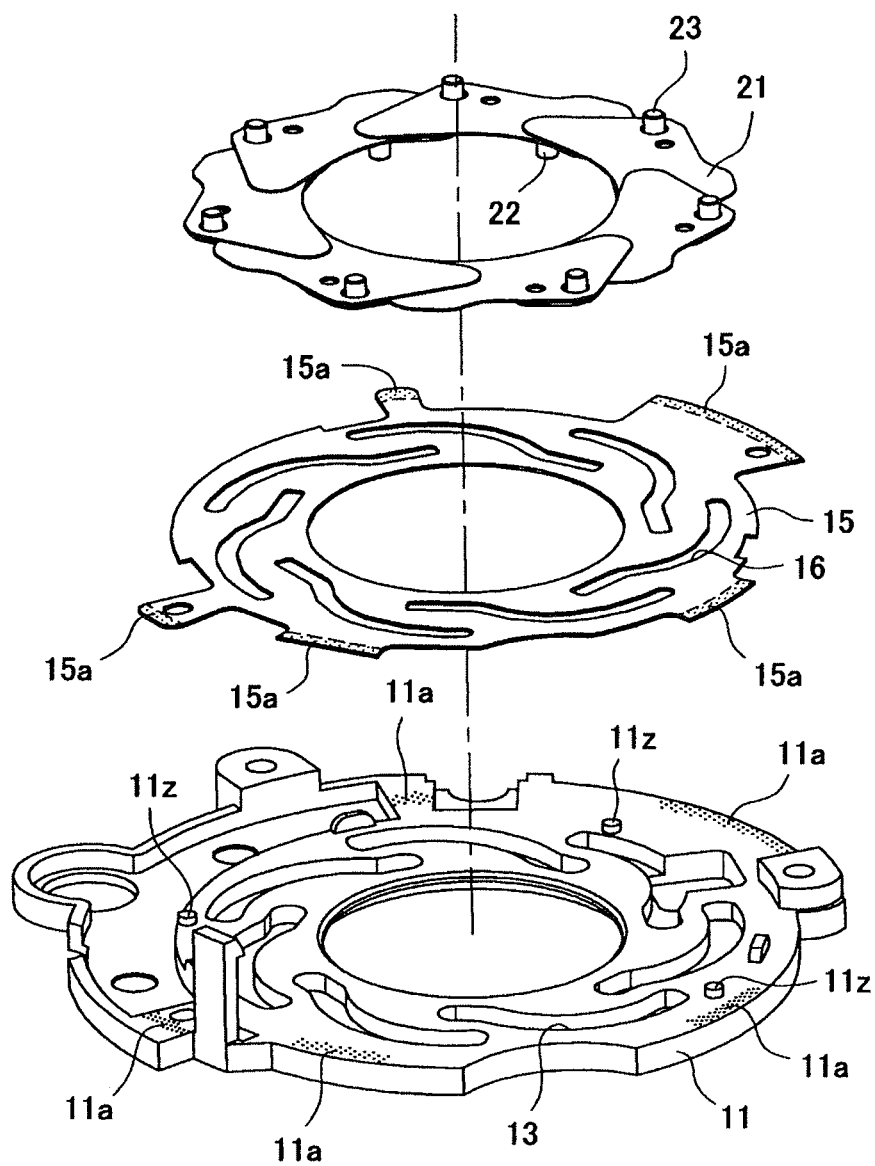
FIG. 26 is a view showing a modification of Embodiment 1.
Figure 27:
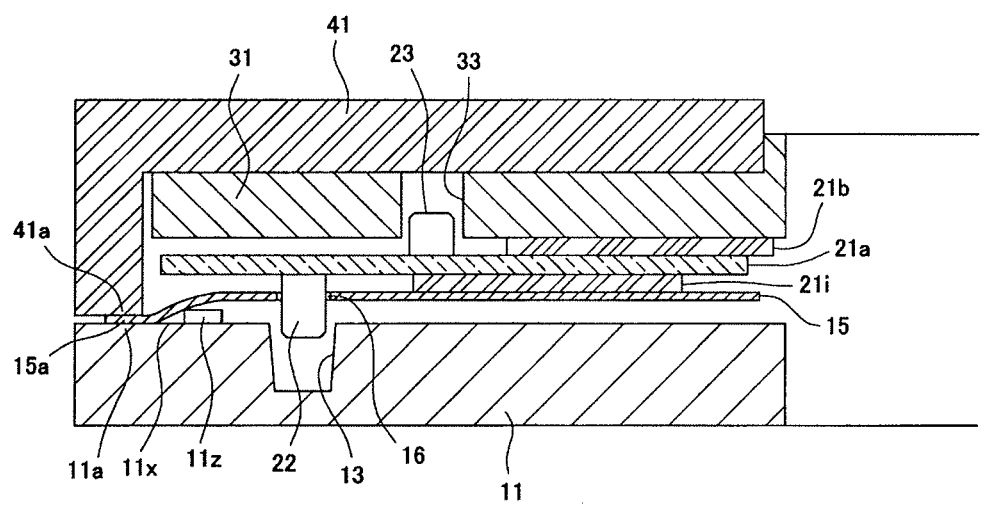
FIG. 27 is a view to explain principles of providing the elastic member (resin plate) with an elastic force in the Embodiment as shown in FIG. 26.

FIGS. 26 and 27 show a modification of Embodiment 1. In assembling the light quantity adjustment apparatus A, the base plate 11 and the hold-down plate 41 are secured with fixing means such as screws. At this point, the resin plate 15 (elastic means) is fixed with end portions 15a sandwiched between fix portions 11a and fix portions 41a respectively of the base plate 11 and the hold-down plate 41. The step portions 11z are provided on the inner side (the optical-axis aperture 12 side) than the fix portions 11a and on the outer side than the guide grooves 13, and raise the resin plate 15 to curve. By this means, the resin plate 15 is provided with the elastic force, and presses the blade members 21 against the driving ring 31 side. In addition, the step portions 11z are only required to have a height difference from the fix portions 11a. Further, the step portion 11z is not limited to the shape of a protrusion, and for example, may be provided on the circumference. Furthermore, the step portion 11z may be provided on the inner side (the optical-axis aperture 12 side) than the guide groove 13.

This application claims priority from Japanese Patent Application No. 2011-104964 filed on May 10, 2011 and Japanese Patent Application No. 2011-154631 filed on Jul. 13, 2011 incorporated herein by reference.

The invention claimed is:

1. A light quantity adjustment apparatus for adjusting a quantity of light passing through an optical-axis aperture with a plurality of blade members, comprising:
   a ring-shaped board having an optical-axis aperture in a center portion thereof;
   a plurality of blade members disposed around the optical-axis aperture to overlap in the shape of scales in a circumferential direction;
   a driving ring disposed with the plurality of blade members sandwiched between the board and the ring to open and close each of the blade members; and
   driving means for rotating the driving ring about the optical-axis aperture,
   wherein in between the board and the driving ring is provided an elastic member in a position facing the plurality of blade members, and
   the elastic member is disposed between the board and each of the blade members and has an elastic force to press each of the blade members against the driving ring side, or is disposed between the driving ring and the blade members and has an elastic force to press each of the blade members against the board side.

2. The light quantity adjustment apparatus according to claim 1, wherein the driving ring is coupled to the driving means to perform arc motion about the optical-axis aperture by a predetermined angle,
   in between each blade member and the board are formed a first protrusion in one of the member and the board and a first groove hole fitted into the first protrusion in other one,
   in between each blade member and the driving ring are formed a second protrusion in one of the member and the ring and a second groove hole fitted into the second protrusion in other one,
   the first protrusion is fitted into the first groove hole, the second protrusion is fitted into the second groove hole, and
   the first groove hole and the second groove hole are formed in a shape such that each of the blade members opens and closes the optical-axis aperture in a predetermined open/close trajectory by the arc motion of the driving ring.

3. The light quantity adjustment apparatus according to claim 2, wherein the first protrusion and the second protrusion are respectively formed on the frontside and backside in each of the plurality of blade members,
   the first groove hole that engages in the first protrusion is formed in the board, the second groove hole that engages in the second protrusion is formed in the driving ring,
   the elastic member is disposed between the board and each of the blade members, and
   in the board is formed a step portion that curves the elastic member to provide elasticity.

4. The light quantity adjustment apparatus according to claim 3, wherein the elastic member is fixed at one end thereof, is curved by the step portion, and is thereby provided with the elastic force.

5. The light quantity adjustment apparatus according to claim 3, wherein the first groove hole is formed of a slit-shaped groove hole that guides the first protrusion movably, the second groove hole is formed of a shaft-hole-shaped groove hole that supports the second protrusion rotatably, the elastic member is disposed between the board and each of the blade members, and in the elastic member is formed a groove hole facing the first groove hole of the board in almost the same shape as the first groove hole.

6. The light quantity adjustment apparatus according to claim 2, wherein the first protrusion and the second protrusion are respectively formed on the frontside and backside in each of the plurality of blade members,
   the first groove hole that engages in the first protrusion is formed in the board, the second groove hole that engages in the second protrusion is formed in the driving ring, the elastic member is disposed between the driving ring and each of the blade members, and in the driving ring is formed a step portion that curves the elastic member to provide elasticity.

7. The light quantity adjustment apparatus according to claim 6, wherein the elastic member is fixed at one end thereof, is curved by the step portion, and is thereby provided with the elastic force.

8. The light quantity adjustment apparatus according to claim 6, wherein the first groove hole is formed of a shaft-hole-shaped groove hole that supports the first protrusion rotatably, the second groove hole is formed of a slit-shaped groove hole that guides the second protrusion movably, the elastic member is disposed between the driving ring and each of the blade members, and in the elastic member is formed a groove hole facing the second groove hole of the driving ring in almost the same shape as the second groove hole.

9. The light quantity adjustment apparatus according to claim 1, wherein the elastic force of the elastic member is provided by a fix portion that fixes one end of the elastic member and a step portion that curves the elastic member, and
the step portion is formed in the board or the driving ring.

10. The light quantity adjustment apparatus according to claim 9, wherein the plurality of blade members is comprised of 6 to 18 blade members, and
the step portion that causes elastic deformation in the elastic member disposed between the board or the driving ring and the blade members is disposed substantially at equal intervals around an outer region of the optical-axis aperture corresponding to the number lower than the number of blade members.

11. The light quantity adjustment apparatus according to claim 1, wherein the elastic force of the elastic member is provided by a cut raised elastic piece provided in the elastic member.

12. The light quantity adjustment apparatus according to claim 11, wherein the plurality of blade members is comprised of 6 to 18 blade members, and
the cut raised elastic piece that causes elastic deformation in the elastic member disposed between the board or the driving ring and the blade members is disposed substantially at equal intervals around an outer region of the optical-axis aperture corresponding to the number lower than the number of blade members.

13. The light quantity adjustment apparatus according to claim 1, wherein the plurality of blade members and the elastic member are made of a same material such as a plastic film.

14. A lens unit comprising:
an image formation lens that forms an image of light from a subject; and
a light quantity adjustment apparatus disposed in a light path extending to the image formation lens from the subject,
wherein the light quantity adjustment apparatus has a configuration according to claim 1.

15. An optical apparatus comprising:
a lens unit having an image formation lens that forms an image of light from a subject, and a light quantity adjustment apparatus that adjusts a quantity of light passing through the image formation lens; and light receiving means for receiving light of the quantity of light that is adjusted by the light quantity adjustment apparatus and that passes through the image formation lens,
wherein the lens unit is the lens unit according to claim 14.

16. A light quantity adjustment apparatus comprising:
a ring-shaped board having an optical-axis aperture in a center portion thereof;
a plurality of blade members disposed around the optical-axis aperture while overlapping in the shape of scales in a circumferential direction to adjust a quantity of light passing through the optical-axis aperture;
a driving ring disposed with the plurality of blade members sandwiched between the board and the ring to open and close each of the blade members; and
driving means for rotating the driving ring about the optical-axis aperture,
wherein each blade member of the plurality of blade members is comprised of a base end portion positioned outside the optical-axis aperture having a pair of shafts that respectively engage in the board and the driving ring, and a blade portion that moves forward and backward with respect to the optical-axis aperture to form a diaphragm aperture, and is provided with elastic means for pressing and biasing the base end portion of the each blade member to the board side or the driving ring side in between the board and the driving ring.

17. The light quantity adjustment apparatus according to claim 16, wherein each of the plurality of blade members is comprised of an elastically deformable blade substrate forming the base end portion and the blade portion, and the elastic means is formed of a protrusion surface having an elastic force formed by a height difference in the base end portion of the blade substrate.

18. The light quantity adjustment apparatus according to claim 17, wherein the protrusion surface is formed of a cut piece formed in the shape of a step by cutting a part of the base end portion of the blade substrate.

19. The light quantity adjustment apparatus according to claim 18, wherein each of the plurality of blade members is comprised of an elastically deformable blade substrate forming the base end portion and the blade portion, and an auxiliary substrate, having a joint surface to be joined to the base end portion, in which are formed the pair of shafts comprised of a first shaft penetrating the base end portion from the joint surface and a second shaft provided to stand on the opposite side to the joint surface, and
the elastic means is formed of a cut piece formed in the shape of a step on the opposite side by cutting a part of the base end portion facing the auxiliary substrate.

20. The light quantity adjustment apparatus according to claim 18, wherein the pair of shafts are supported by adhesion or welding or integrally formed in the base end portion of the each blade member, and
the elastic means is formed of a cut piece formed in the shape of a step by cutting a part of the base end portion in between the pair of shafts.

21. The light quantity adjustment apparatus according to claim 16, wherein the elastic means is comprised of a spring member which is wound around one of the pair of shafts of the each blade member and is compressed and arranged in between the base end portion and the board or the driving ring in which the one of the shafts engages.

* * * * *